United States Patent
Hansen et al.

(10) Patent No.: US 9,321,613 B2
(45) Date of Patent: Apr. 26, 2016

(54) BLADE GRIPPING DEVICE

(71) Applicant: SIEMENS AKTIENGESELLSCHAFT, München (DE)

(72) Inventors: Steen Mattrup Hansen, Svendborg (DK); Jesper Moeller, Brande (DK); Kenneth Helligsoe Svinth, Aarhus C (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/326,506

(22) Filed: Jul. 9, 2014

(65) Prior Publication Data

US 2015/0028610 A1 Jan. 29, 2015

(30) Foreign Application Priority Data

Jul. 29, 2013 (EP) .................................... 13178399

(51) Int. Cl.
*B66C 1/00* (2006.01)
*B66C 1/10* (2006.01)
*F03D 1/00* (2006.01)

(52) U.S. Cl.
CPC ................ *B66C 1/108* (2013.01); *F03D 1/001* (2013.01); *F03D 1/005* (2013.01)

(58) Field of Classification Search
CPC ............ B66C 1/108; B66C 1/18; B66C 1/16; B66C 1/12; B66C 1/62; B66C 1/10; B66C 1/105; B66C 13/08; B66C 1/14; B65D 2519/00293; F16G 11/14; H01L 21/67259; B25J 19/02; B25J 19/021; B25J 19/022; B25J 19/023; B25J 19/025; B25J 19/027; B25J 19/04

USPC ......... 294/907, 67.1, 67.5, 81.4, 81.1; 901/47
See application file for complete search history.

(56) References Cited

U.S. PATENT DOCUMENTS

| | | | | |
|---|---|---|---|---|
| 4,266,904 A | * | 5/1981 | Fadness | 414/460 |
| 6,321,137 B1 | * | 11/2001 | De Smet | 700/245 |
| 8,191,721 B2 | * | 6/2012 | Hansen et al. | 212/273 |
| 2005/0225104 A1 | * | 10/2005 | Lim et al. | 294/81.1 |
| 2008/0006806 A1 | * | 1/2008 | Hall et al. | 254/362 |
| 2009/0025219 A1 | * | 1/2009 | Hansen et al. | 29/889 |
| 2010/0168908 A1 | * | 7/2010 | Maeda et al. | 700/228 |

(Continued)

FOREIGN PATENT DOCUMENTS

| WO | 2011/050999 A1 | 5/2011 |
|---|---|---|
| WO | WO 2012167788 A2 | 12/2012 |

OTHER PUBLICATIONS

European Search Report for European Application No. 13178399.5, mailed on Jan. 8, 2014.

*Primary Examiner* — Gabriela Puig
(74) *Attorney, Agent, or Firm* — Schmeiser Olsen & Watts LLP

(57) ABSTRACT

A blade gripping device for gripping a rotor blade, in particular a rotor blade of a wind turbine, comprising a blade gripping assembly with a number of blade gripping tools and a sensor arrangement realized to sense a specific feature of the rotor blade is provided. Thereby, the specific feature is such that it can orientate the blade holding device relative to the rotor blade in a blade gripping maneuver. A method of moving a blade gripping device for gripping a rotor blade is also disclosed, in particular a rotor blade of a wind turbine, relative to the rotor blade is disclosed.

16 Claims, 12 Drawing Sheets

(56) References Cited

U.S. PATENT DOCUMENTS

| | | | |
|---|---|---|---|
| 2012/0027561 A1* | 2/2012 | Riddell et al. | 414/800 |
| 2012/0098283 A1 | 4/2012 | Maj et al. | |
| 2014/0150227 A1* | 6/2014 | Teichert | 29/23.51 |
| 2014/0199788 A1* | 7/2014 | Vermont et al. | 438/5 |
| 2015/0026978 A1* | 1/2015 | Hansen et al. | 29/889 |

\* cited by examiner

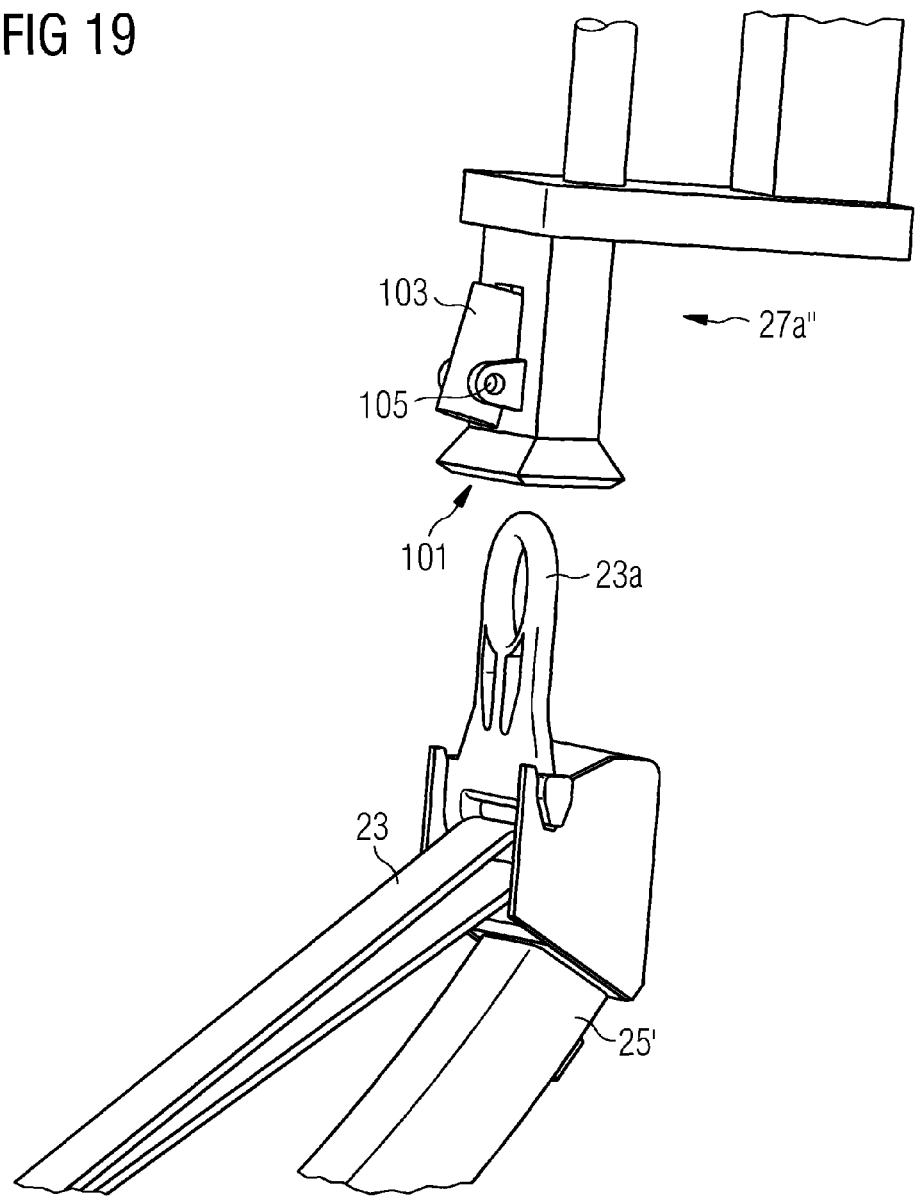

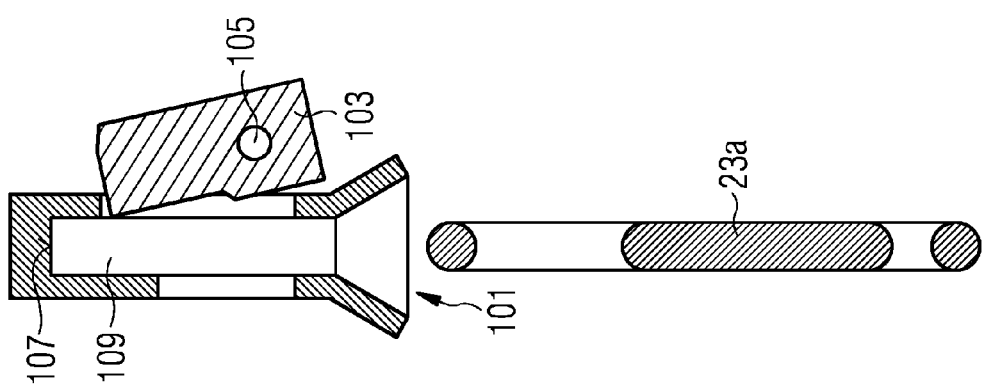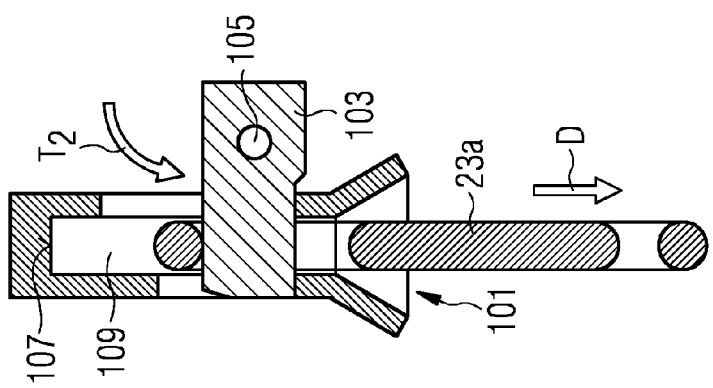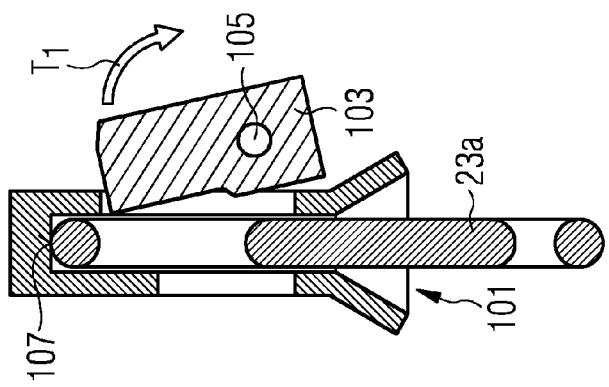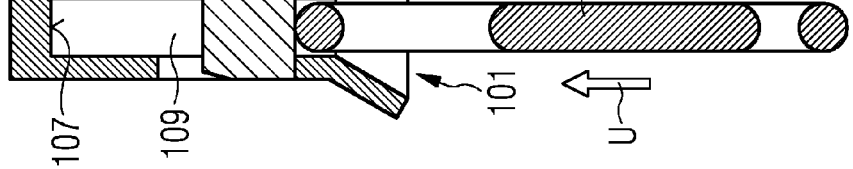

BLADE GRIPPING DEVICE

CROSS-REFERENCE TO RELATED APPLICATIONS

This application claims priority to EP Application No. 13178399.5 having a filing date of Jul. 29, 2013, the entire contents of which are hereby incorporated by reference.

FIELD OF TECHNOLOGY

The following relates to a blade gripping device for gripping a rotor blade, in particular a rotor blade of a wind turbine, i.e. a rotor blade of a large size such as of 20 meters, 50 meters in length or longer. Such gripping device is realized for a transport of the rotor blade to and/or from an assembly site, in particular an assembly site of a wind turbine. The gripping device thus serves to grip the rotor blade firmly so that it can be transported (i.e. lifted) to the nacelle of the wind turbine and/or lowered from the latter. A method of moving a blade gripping device for gripping a rotor blade, in particular a rotor blade of a wind turbine, relative to the rotor blade, is further disclosed.

BACKGROUND

The assembly of rotor blades on wind turbines and their transport to and fro is a time-consuming, relatively dangerous and also costly task. Prior art gripping devices (also referred to as yoke) often consist of a frame and a number of straps which are wound around at least part of the rotor blade to hold the rotor blade in place. This involves a lot of manual assistance: the frame has to be directed towards the rotor blade very exactly so that the rotor blade fits into the frame. Further, the straps have to be wound around the rotor blade and also unwound manually which involves work at substantial heights. Technicians are typically lifted to the assembly height by a basket from which they operate during the assembly or disassembly of the rotor blade.

For instance, international patent application WO 2011/050999 A1 shows a solution of a dismounting system of a rotor blade of a wind turbine. The system comprises a stable main frame and a strap moving mechanism connected to the main frame. The strap moving mechanism leads the strap around the rotor blade by means of a number of beams that temporarily hold an end portion of the strap to lead it from one side of the rotor blade to the other side along about a half circle. For that purpose, the beams are tilted in several tilting directions in order to eventually encompass the rotor blade partially.

Generally, it is a problem to connect a blade gripping device to a rotor blade because when placing the blade gripping device upon the rotor blade in a correct position in which the blade gripping device fits to the rotor blade and vice versa; a lot of manual adjustment must be done. The blade gripping device can be positioned relative to the rotor blade by maneuvering a crane or other lifting device which holds the gripping device and/or by using and moving taglines attached to the blade gripping device. For instance, such taglines can be pulled manually and/or by winches.

Staff must also be close to the site where the connection of the blade gripping device and the rotor blade takes place, as a visual control is necessary. This requirement is already complicated when the rotor blade is positioned on the ground, but by far more so when it is assembled on a rotor of a wind turbine, i.e. when it is to be disassembled from that rotor in substantial heights which may well exceed 80 meters.

At the same time, it must be guaranteed that the rotor blade is not damaged during the connection process and while it is lifted when using the blade gripping device.

SUMMARY

An aspect relates to improving the positioning of a blade gripping device relative to a rotor blade. In particular, this improvement includes making such process easier and/or more reliable and/or safer.

An aspect relates to a blade gripping device for gripping a rotor blade of a wind turbine, said rotor blade having multiple pitch angles along its axis, said blade gripping device comprising: a blade gripping assembly with at least one frame and a number of blade gripping tools, including a movable seat which has a portion which conforms to a rotor blade, a sensor arrangement realized to sense a specific feature of the blade, and a position computation unit to compute a pitch angle of the rotor blade, whereby the position computation unit is configured to orientate the seat relative to the frame in a blade gripping manoeuvre to move the seat to the computed pitch angle of the rotor blade along the horizontal axis.

An aspect relates to a method of moving a blade gripping device with at least one frame for gripping a rotor blade of a wind turbine, relative to the rotor blade, whereby the device comprises a blade gripping assembly with a number of blade gripping tools including a seat on one side and a sling on the other side for encircling opposite sides of the rotor blade, and a sensor arrangement and whereby the sensor arrangement senses a specific feature of the rotor blade in order to support a movement of the device, whereby the specific feature is such that it is used to tilt the seat and the sling about a horizontal axis relative to the frame and the rotor blade in a blade gripping manoeuvre.

The blade gripping device can be the kind mentioned in the introductory paragraph, and may comprise a blade gripping assembly with a number of blade gripping tools and a sensor arrangement realized to sense a specific feature of the rotor blade. Thereby, the specific feature is such that it can be used to orientate the blade holding device relative to the rotor blade in a blade gripping manoeuvre.

In this context, an exemplary embodiment of the blade gripping assembly may comprise at least two blade gripping tools which are realized to grip the rotor blade at two different positions along the longitudinal extension of the blade. The position and shape of such plurality of blade gripping tools may be such that the rotor blade when held by the blade gripping device in a designated gripping position is held essentially horizontally. This can for instance be realized by positioning the centre of gravity of the rotor blade such that it is essentially placed below (or above) the centre of gravity of the blade gripping device.

Embodiments of the blade gripping device may comprise a sensor arrangement. Specifically, embodiments of the sensor arrangement are realized to sense a specific feature of the rotor blade. For that purpose, the sensor arrangement may comprise at least one sensor. Embodiments of the sensor arrangement may include a plurality of sensors. These sensors and/or a recognition unit connected to at least one of the sensors (which recognition unit may be considered a part of the sensor arrangement wherever it is located, i.e. even in such cases in which it is positioned anywhere away from the sensor which feeds it with data) can serve to sense a specific feature of the rotor blade, which may for instance be a particular location or position of the rotor blade and/or a marker and/or a specific shape or the like.

The specific feature can be used to orientate the blade holding device relative to the rotor blade in a blade gripping manoeuvre. Thus, the feature can be somehow directly or indirectly related to a specific location of the rotor blade. For instance, a marker of the rotor blade represents a location of the rotor blade, namely the (known) location where the marker is situated. A shape of the rotor blade can be used to compute the corresponding location of the rotor blade. Many more examples of specific features in this context are possible.

The sensors can be positioned and directed such that they can sense the rotor blade, i.e. at least be temporarily directed to the outside of the overall extension of the blade gripping device. In the case of a blade gripping device which grips the rotor blade underneath it, at least one sensor of the sensor arrangement may be positioned and directed such that its sensing direction faces downwards at least until the rotor blade is gripped by the blade gripping device. Then, a more sideways direction of sensing in the direction of the rotor blade can be possible. For such purpose, at least one sensor of the sensor arrangement may be adjustable in its position and/or orientation, for instance movable along a part of the blade gripping device and/or tiltable along at least one axis, such as a horizontal axis.

With the help of such sensor arrangement, it is now possible to, for instance, automatically recognize the position of the blade gripping device relative to the rotor blade and/or to have a recognition aid at hand by which means an operator may derive such position by himself. In other words, the sensor arrangement may be used as a positioning means or more specifically as a positioning aid to assist the correct positioning of the blade gripping device (or parts, in particular movable parts, thereof) relative to the rotor blade.

Embodiments of the may also include a blade assembly. Embodiments of the blade assembly may comprise a rotor blade, in particular a rotor blade of a wind turbine, and a blade gripping device according to embodiments of the invention. It may further include a method of moving a blade gripping device for gripping a rotor blade, in particular a rotor blade of a wind turbine, relative to the rotor blade, whereby the device may comprise a blade gripping assembly with a number of blade gripping tools and a sensor arrangement. Thereby, the sensor arrangement may sense a specific feature of the rotor blade in order to assist the movement of the device (again, or parts thereof). Thereby, the specific feature can be used to orientate the blade holding device relative to the rotor blade in a blade gripping manoeuvre. In other words, use is made of a device according to embodiments of the invention which device in operation senses the above-listed (or other similar) features of the rotor blade, wherein the features can be used in the context of such moving method.

Embodiments and features of the invention are given by the dependent claims, as revealed in the following description. Features of different claim categories may be combined as appropriate to give further embodiments not described herein.

According to a first embodiment, the sensor arrangement may comprise at least one sensor configured to detect a specific shape of the rotor blade and/or of a part thereof. The sensor arrangement thus may comprise a shape detection unit as recognition unit (or vice versa: a recognition unit comprises a shape detection unit for that purpose). Thereby, once the specific shape is detected by the sensor arrangement, this shape can reveal a certain position of (or on) the rotor blade and/or of the part of the rotor blade which is currently sensed by the sensor. That means that from the detected shape, a specific location of the rotor blade can be derived and thus a specific position of the blade gripping device relative to the rotor blade.

An exemplary embodiment of the sensor arrangement may comprise at least one sensor realized to detect a specific position of the rotor blade, in particular a position of the rotor blade relative to the device. This implies that the sensor can be combined with a position detection unit as recognition unit (or vice versa: the recognition unit comprises a position detection unit for that purpose). The sensed position of the rotor blade can then be brought into a common coordinate system with the blade gripping device so as to derive the relative position of the rotor blade to the blade gripping device.

According to a second embodiment which can be combined with the first embodiment or used as an alternative thereof, the sensor is configured to detect a marker of the rotor blade, i.e. on the rotor blade's surface and/or embedded in the rotor blade. Such marker can again serve to indicate a particular part of the rotor blade and/or a particular position thereof. For instance, the marker can comprise a magnetic marker, i.e. a marker which is not necessarily visible to the human eye as it can be embedded in the rotor blade or attached to it in other invisible manners. Another aspect of a magnetic marker is the high reliability when sensing such a marker. It only need to have a strong enough magnetic property to be detectable. Alternatively or additionally, the marker can also be an optical marker, for example comprising a colour (code) different from the colour of the rotor blade so that it can also be easily distinguishable from the "normal" surface of the rotor blade. Other optical markers such as light-emitting markers and even audible markers or the like can be used—depending on the particular circumstances of operation of the blade gripping device. For instance, optical markers may not be so convenient if the device is often operated in foggy conditions, audible markers may then be more helpful. On the other hand, audible markers need an energy input to generate a sound. Generally, it depends thus on the very circumstances and surroundings of operation of the blade gripping device which marker is preferred in a particular case of application.

According to a first variant, embodiments of the sensor arrangement may comprise at least one optical sensor. Such optical sensors are easy to operate and available in great variety. Further, an optical sensor need not necessarily be connected to a recognition unit because an operator may be able to receive optically visible sensing data from it, in particular pictures. In exemplary embodiments, the optical sensor comprises a camera, which operates in an optical wavelength perceptible to the human eye. Such camera sensing data can be transferred to an operator who can then watch the rotor blade (and possible parts of the blade gripping device) from a remote position. In such case, the operator, though not close to the rotor blade and the blade gripping device, can still see at least the rotor blade which makes unnecessary a presence of an operator right by the rotor blade. Time-consuming and dangerous operations by staff can thus be avoided. This is particularly the case if the camera operates exclusively or nonexclusively in the above-mentioned optical wavelength bandwidth: the operator basically sees what he would see as well if he was physically close to the rotor blade.

As an alternative or add-on to an optical sensor comprising a camera, the optical sensor can also comprise a laser sensor. Such laser sensor in particular can make possible very accurate and precise measurements of location and/or extension of (a part of) the rotor blade.

Accordingly, the blade gripping device may function together with markers, e.g. with magnetic markers. In exemplary embodiments, the sensor arrangement then may comprise at least one sensor realized to sense a magnetic field, for instance a Hall effect sensor. This magnetism sensor thus can sense the magnetic marker(s) mentioned above. Such sensors can be particularly small. They may be shielded from magnetic influence of (adjacent parts of) the blade gripping device in order not to sense erroneously a magnetic influence from the rotor blade which just came from the blade gripping device itself.

Another possibility of a sensor system is a capacitive sensor, which may, again, interact with a marker of the rotor blade essentially in the corresponding way as a magnetism sensor with a magnetic marker.

According to an exemplary embodiment, the sensor arrangement may comprise a position computation unit realized to compute a specific position—such as for instance the centre of gravity—and/or an orientation of the rotor blade from sensor data provided by a number of sensors of the sensor arrangement. Such position computation unit may be comprised in a recognition unit as outlined above. It can supply a coordinate system of positions and/or orientations of the rotor blade and of the blade gripping device which positions and/or orientations can be matched in order to derive therefrom information about how and where the blade gripping device or parts thereof should be moved and/or orientated in order to match with the position of the rotor blade. For instance, information can be derived about where the blade gripping device's centre of gravity is positioned relative to the centre of gravity of the rotor blade and/or how the former must be maneuvered fully or in part so that the longitudinal extension of the blade gripping assembly matches with the longitudinal extension of the rotor blade.

The device can further comprise a number of position adjustment assistance means realized to assist a movement of the device relative to the rotor blade. Such position adjustment assistance means thus serve to assist an operator (and/or an automatic system) to move and/or orientate the device (or parts thereof) into a desired engagement position in which the blade gripping device can initiate and/or proceed with a gripping process of gripping the rotor blade. In particular, the position adjustment assistance means may comprise one or more of the following elements:

a display for an operator: the operator can use such display to obtain visual help such as pictures from a camera sensor and thereby remotely control the current position of the blade gripping device or of parts thereof, in particular of the blade gripping assembly or of parts thereof.

an acoustic and/or optical signal generating unit realized to output sound and/or light signals representing a position of the device relative to the rotor blade. Such sound and/or light signals can indicate acoustically and/or optically the position and/or orientation of the blade gripping device or of parts thereof such as the one mentioned above. The sound and/or light signals may be encoded to represent different stati of the blade gripping device relative to the rotor blade and/or of proximities of these and/or of potential dangers. For instance, sound signals may include sounds different in duration and/or rhythm and/or tone and/or loudness, dependent on the position of the blade gripping device relative to the rotor blade. Similarly, light signals may include lights different in duration and/or rhythm and/or colour and/or brightness, dependent on the position of the blade gripping device relative to the rotor blade.

an automatic movement mechanism realized to automatically move the blade gripping tools of the device into a predefined gripping position with respect to the rotor blade. Such automatic movement mechanism can for instance be realized as (i.e. comprise) a fully or partially (i.e. operator assisted) automatic guiding system which moves the blade gripping assembly or parts thereof (i.e. at least the blade gripping tools) towards the rotor blade, dependent on the sensed position of the blade gripping device relative to the rotor blade which is to be held by the blade gripping device.

Embodiments of the invention can further comprise some or all the features of two special embodiments which are described at some length below. Thereby, the two special embodiments may also be intercombined.

Embodiment 1

A blade gripping device as mentioned in the introductory paragraph may comprise according to the embodiment 1:

a first frame which is essentially horizontally aligned in a designated operating position and a second frame which is essentially horizontally aligned in the designated operating position and a blade gripping assembly with a number of blade gripping tools, whereby the first frame and the second frame are connected to each other via a swivel connection which swivel connection is realized to permit a yawing movement of the second frame relative to the first frame.

In this context, the blade gripping assembly may comprise at least two blade gripping tools which are realized to grip the rotor blade at two different positions along the longitudinal extension of the blade. The position and shape and mechanism of such plurality of blade gripping tools is such that the rotor blade, when held by the blade gripping device in a designated gripping position, is held essentially horizontally. This can for instance be realized by positioning the centre of gravity of the rotor blade such that it is essentially placed below or above the centre of gravity of the blade gripping device.

In essence, the embodiment 1 realizes a blade gripping device which can be divided into two different functional parts, namely the first frame and the second frame. The first frame may serve as an interface frame which is to be connected to a lifting device such as a crane. The second frame can be orientated freely in an essentially horizontal plane as it is movable, i.e. rotatable relative to the first frame along a vertical axis in a designated operating position of the blade gripping device. This allows for an increased flexibility when positioning the blade gripping device into a desired engagement position in which the blade gripping device can initiate and/or proceed with a gripping process of gripping the rotor blade. Once the blade gripping device is positioned above (or below) the rotor blade, the first frame can be yawed such that it is also orientated correctly and then the gripping process can be initiated. In other words, the blade gripping device, due to its higher flexibility, may allow for a faster, easier, and also safer process of connecting the rotor blade to it.

The embodiment 1 may also concern a blade assembly comprising a rotor blade, in particular a rotor blade of a wind turbine, and a device according to the embodiment 1. It may further concern a method of operating a blade gripping device for gripping a rotor blade, in particular a rotor blade of a wind turbine, relative to the rotor blade, whereby the device comprises a first frame which is essentially horizontally aligned in a designated operating position and a second frame which is essentially horizontally aligned in the designated operating position and a blade gripping assembly with a number of blade gripping tools, whereby the first frame and the second frame are connected to each other via a swivel connection which swivel connection is realized to permit a yawing movement of the second frame relative to the first frame. Thereby, the second frame is yawed in such way that an axis of the device (namely of the second frame) is aligned with a longitudinal axis of the rotor blade in such way that the gripping tools can grip the rotor blade in a designated gripping position.

That means that the blade gripping device according to the embodiment 1 can be used for the method according to the embodiment 1 and that its second frame can be tilted to engage in a designated (i.e. desired, predefined) position in which the blade gripping tools are in the right place to grip the rotor blade. Such right place to grip the rotor blade can be defined by the following parameters:

Firstly, the shape of the rotor blade may have to match in the right place with the shape of the blade gripping tools. As modern rotor blades do not have the same cross-sectional extensions all along their longitudinal extension the shape of the blade gripping tools may not fit with the rotor blade at any location along that longitudinal extension. The right place may be a location of the rotor blade at which the inner shape of the blade gripping tool can be fit onto the outer shape of the rotor blade.

Secondly, the location at the rotor blade at which the blade gripping tool grips it may be matched with other locations of the rotor blade at which other blade gripping tools grip the rotor blade. In essence, all blade gripping tools of the blade gripping assembly are positioned such that they can grip a part of the rotor blade. Further, they can be positioned such that in combination, they grip the rotor blade firmly in an essentially horizontal position. This way, assembly and/or disassembly of the rotor blade at the rotor of a wind turbine is facilitated as the rotor blade is aligned in the position in which it can be assembled and/or disassembled on the rotor's hub.

Thirdly, the centre of gravity of the rotor blade is essentially placed below or above the centre of gravity of the blade gripping device. This helps avoiding instabilities during transport of the rotor blade by means of the blade gripping device.

If it least one of these parameters is fulfilled, at least two, and/or all three, the right place or position can be established.

According to an exemplary embodiment of the embodiment 1, the swivel connection may comprise a swivel bearing, wherein a swivel bearing may comprise a roller bearing. Generally, such bearing provides for a smooth tilting or rotation movement of the second frame relative to the first frame. Thereby, the swivel bearing can for instance comprise a yaw ring. Thereby, it can be noted that the expression "yaw ring" may not refer to a yaw ring which can be found in wind turbines at the interface between the wind turbine tower and its nacelle. Yaw ring may describe the function (to permit the yawing movement) and form (the ring form) of the swivel connection. Such yaw ring can help to carry heavier loads than a swivel connection with a smaller extension. The yaw ring may be supported by means of a support frame comprised by and/or connected to the first frame and/or comprised by and/or connected to the second frame. Two support frames, one comprised by and/or connected to the first frame and one comprised by and/or connected to the second frame, may be used for reasons of stability.

The yawing movement can, for instance, be actuated manually, for instance, by means of taglines or the like. In order to further facilitate the positioning and orientation process of the blade gripping device, the device may comprise a number of electric and/or hydraulic (generally throughout this description hydraulic also includes pneumatic) actuators realized to generate the yawing movement. In other words, the yawing movement is fully or partially an automatic one so that no or at least less manual input is necessary. This reduces the dangers during operation of the blade gripping device and also the time necessary for connecting the blade gripping device to the rotor blade.

In this context, at least one electric actuator may comprise a gear motor. Gear motors are particularly easy to control and can position the second frame relative to the first frame with a high precision and accuracy. The desired yawing position of the second frame can thus be fixed very precisely as well.

Generally, it is possible that both the first frame and the second frame comprise parts of the blade gripping assembly. For instance, a first number of blade gripping tools can be comprised by the first frame and a second number of blade gripping tools can be comprised by the second frame. By yawing the second frame, the positions of the second number of blade gripping tools relative to the first number of blade gripping tools can thus be varied. The blade gripping assembly can be realized as a part of the second frame, i.e. it may comprise all blade gripping tools of the blade gripping device. This results in a clear functional division between the first frame and the second frame. The first frame then essentially constitutes the interface to a lifting device (cf. above) and the second frame serves as a support for the all parts of the blade gripping assembly. In such case, the blade gripping tools can be installed at a fixed distance from each other (but can also be installed movably relative to each other instead), possibly also with a fixed orientation (but also with a variable orientation). All the blade gripping tools can be fixedly installed both relative to each other and concerning their orientation. This way, the fixed distances and orientations help to give a predefined framework for an operator and/or a control system when connecting the blade gripping tools to the rotor blade. In particular, orientation for such operator and/or control system is facilitated.

The first frame may comprise a rectangular carrying structure, the extension of which essentially corresponds with a rectangular carrying structure of the second frame. That means that the difference of extension of the first and second frame in both the longitudinal direction and the cross-direction perpendicular to the longitudinal direction (in the horizontal plane) is less than 50%. At least one horizontal extension of the first frame is essentially equal one horizontal extension of the second frame, both the longitudinal extension and the (above-mentioned) cross-extension. Both frames may comprise the same beam structure with the same extensions and materials such as beams or the like. Thus, they can be used as standard frames.

Both rectangular carrying structures may be oblong carrying structures i.e. non-quadratic ones. The longer extension of a carrying structure then defines its longitudinal extension. Thereby, the longitudinal extension can be at least double the perpendicular horizontal cross-extension to the longitudinal extension. The longitudinal extension of at least the first or the second frame (or both frames) is at least 10 meters, at least 13 meters, and/or at least 15 meters. Further, the cross-extension is at least the width of the rotor blade, at least 5 meters, at least 5.5 meters, and/or at least 6 meters. With such extensions, it can be possible to stably grip and carry a rotor blade of today's dimensions and possibly larger.

In particular, the second frame may be oblong as its longitudinal extension can then better correspond to the long shape of the rotor blade which it is to grip.

Further, it the first frame may comprise a rectangular carrying structure with at least four connectors for connection to a lifting device, which connectors can be positioned essentially at the corners of the rectangular structure. This means that the connection to the lifting device such as a crane is not just realized at one point (which would imply very high loads at such connector), or at two or three points (which would still imply high loads and a substantial instability of the blade gripping device when suspended). Instead, a very stable, symmetric connection structure is used which can effectively help to horizontally align the blade gripping device as well as the blade assembly (with the rotor blade). Furthermore, with such device with connectors essentially at corners of the first frame, full use can be made of the extension of the first frame which helps to even further stabilize the blade gripping device (and blade assembly) when suspended.

Embodiment 2

According to the embodiment 2, embodiments of the blade gripping tool may comprise
 a sling and
 a (possibly automatic) sling handover mechanism with a sling-conveying element and a sling-receiving element, whereby the sling-conveying element is realized to convey a connection means of the sling along a two-dimensional predefined path of travel around a part of the rotor blade, i.e. from an open position of the gripping tool, towards the sling-receiving element, to connect to a receptor of the sling-receiving element, i.e. to establish a closed position of the blade gripping tool in which the sling-receiving element keeps the connection means of the sling within its receptor.

As for the connection means, this can, for instance, be realized as an eye or ring at one end of the sling, namely that end of the sling which is to be connected to the sling-receiving element.

Embodiments of the blade gripping tool may comprise an automatic sling handover mechanism. Such automatic, i.e. self-driven mechanism may comprise a number of actuator means to allow for the movement of the sling-conveying element and/or of the sling-receiving element. Such actuators may e.g. be electric (i.e. based on an electric motor) and/or hydraulic (which throughout this description includes pneumatic) and/or based on a spring. Other actuators may also be used instead, always depending on the particular circumstances of operation and/or size and/or space within the blade gripping tool and/or within a blade gripping device equipped with the blade gripping tool according to the embodiment 2.

The blade gripping device may comprise a sling-conveying element and a sling-receiving element which interact: the sling-conveying element conveys the connection means of the sling and thus the sling itself (by tearing the sling along the path of travel) to the sling-receiving element along a two-dimensional path of travel, i.e. along a path of travel which is all along one plane, such as a vertical plane. Herein lies a difference in comparison with the state of the art, which makes the movement of the sling much simpler and which safes a lot of space during the connection of the rotor blade to the blade gripping tool (and blade gripping device).

Moving the connection means solely along a two-dimensional path of travel, e.g. along a straight or a curved line, implies that unlike in the state of the art, several changes of the direction of movement of the connection means may be necessary. Whereas the state of the art proposes a system with a sling-conveying element comprising several hinges, the embodiment 2 makes use of a much compact sling-conveying element which requires much less space while being stored and particularly while being moved. Firstly, the sling-conveying element can be retractable (along essentially its entire length) into an accommodation section of the blade gripping tool, and secondly (alternatively or additionally) that it may comprises a single-piece guidearm rather than a number of hingedly connected arms.

In addition, the movement of the sling-conveying element can be calculated much more accurately so that it is easier to guarantee that no other parts of the blade gripping device stand in its way (i.e. the path of travel) while it moves. Not only is the system thus simpler to use, but also safer. In addition, less or no relatively weak interconnections (such as the hinges in the state of the art) are necessary, which would not just be a potential danger during operation but which also would have to be controlled separately during the movement of the sling-conveying element.

Embodiments of the blade gripping assembly may comprise at least two such blade gripping tools (potentially all according to the embodiment 2) which are realized to grip the rotor blade at two different positions along the longitudinal extension of the rotor blade. The position and shape of such plurality of blade gripping tools is such that the rotor blade, when held by the blade gripping device in a designated gripping position, is held essentially horizontally. This can, for instance, be realized by positioning the centre of gravity of the rotor blade such that it is essentially placed below or above the centre of gravity of the blade gripping device.

The embodiment 2 may also relate a method of gripping a rotor blade, in particular a rotor blade of a wind turbine, by means of a number of blade gripping tools of a blade gripping device, at least one of which blade gripping tools comprises a sling and an automatic sling handover mechanism comprising a sling-conveying element and a sling-receiving element. Thereby, the sling-conveying element conveys a connection means of the sling along a two-dimensional predefined path of travel around a part of the rotor blade towards the sling-receiving element to connect to a receptor of the sling-receiving element.

In other words, use is made of a blade gripping tool according to the embodiment 2, whereby the sling-conveying element moves the sling to hand it over to the sling-receiving element.

According to an exemplary embodiment of the embodiment 2, the sling-conveying element comprises a curved shape, which defines the path of travel, which path of travel is thus correspondingly curved. Such curved sling-conveying element thus is shaped such that it permits for a movement which describes a corresponding curve. Such curve is shaped such that it leads the connections means of the sling around (at some distance) the outer limits of the rotor blade. As the outer limit of the rotor blade is convex, the curve is also convex. The curve may in particular comprise a shape which is part of a circle and/or which is part of an ellipse and/or which is part of a parable. The curvature all along the path of travel may be only in one principal direction, namely convex when looking at the path of travel from a position facing towards the rotor blade and concave when looking at the path of travel from a position facing away from the rotor blade with the rotor blade in a designated gripping position within the blade gripping tool.

Further, it the path of travel is coplanar with a cross-extension of the rotor blade perpendicular to the longitudinal extension of the rotor blade. When the rotor blade is placed within the blade gripping tool, it is held in an essentially horizontal alignment. A vertical plane which is perpendicular to this horizontal plane of the rotor blade is then that plane along which the path of travel goes. This means that the path of travel is the shortest connection around the rotor blade (at a given distance from the rotor blade) from one side of the blade gripping tool at one side of the rotor blade (where the sling is fixed and/or connected to a solid part of the blade gripping tool) to another side of the blade gripping tool at the other side of the rotor blade, where the sling-receiving element is situated.

The sling handover mechanism may comprise a guiding mechanism realized to guide the sling-conveying element along the path of travel which path of travel is described by the combination of the shape and location of the guiding mechanism and the shape and location of the sling-conveying element. Such guiding mechanism may for instance be comprised of a number of guiding rollers situated and aligned to define the path of travel, which may result in a reliable guiding system and at the same time provide for a smooth guidance and movement of the sling-conveying element. Generally, such guiding mechanism works together with the sling-conveying element, the shapes of which together with the alignment (and/or shape) of the guiding mechanism to define the two-dimensional path of travel.

The sling handover mechanism may comprise an actuator which in operation automatically moves the sling-conveying element from the open position towards a handover position. Such actuator may for instance comprise a spring based mechanism and/or an electric motor and/or a hydraulic actuator, the actuator being connected to the sling-conveying element via a force transition system such as a force transition system comprising toothed wheels (i.e. sprockets) or the like. The actuator serves to automatize the movement of the sling-conveying element so that no staff needs to be present at the blade gripping device to move the sling-conveying mechanism. In other words, no manual intervention by staff is necessary, which effect makes the movement process of the sling-conveying element possibly faster, more reliable and also safer. It may be noted in that context that the handover position mentioned above corresponds with the closed position of the blade gripping tool. That means that in the handover position, the connection means of the sling is positioned such that it can be connected to the sling-receiving element to be firmly positioned in the closed position.

As for the sling-conveying element, this may comprise an engaging element realized to engage with the connection means of the sling. This engaging element is realized such that it automatically engages with the connection means of the sling. For that purpose, the term "engaging element" is referred not solely to the mechanical part which engages with the connection means of the sling, but may also comprise guiding means to automatically guide the connection means into an engaging position of the engaging element. This way it can be guaranteed that whenever the connection means of the sling is disconnected from the sling-receiving element, it either rests in the engaging element or is currently being directed back there to automatically engage with it. The sling may thus never hang loose and interfere with other operations of the blade gripping tool and/or the blade gripping device. For that purpose, the sling may also be connected to an actuator such as a spring mechanism or the like which automatically leads back the sling, in particular the connection means of the sling, towards the engaging element of the sling-conveying element.

In particular, the engaging element is realized and positioned such in a handover position of the sling-conveying element that the connection means of the sling, when positioned in an open position of the sling handover mechanism, is automatically positioned to engage with the engaging element. Thus, when both the sling-conveying element and the connection means of the sling are completely in the open position, for instance retracted into a solid part of the blade gripping device, the connection means of the sling is automatically in such position in which it must engage with the engaging element. For that purpose, the blade gripping device comprises the above-mentioned guiding means which in this particular case are realized such that they lead the connection means of the sling into the desired handover position when the connecting part of the engaging element of the sling-conveying element is positioned there (if the connection means of the sling is not connected to the sling-receiving element).

As for the sling-receiving element, according to one embodiment of the embodiment 2, a receptor of it comprises a hook. Such receptor is designated for receiving the connection means of the sling. A hook is particularly useful as it can engage easily with the connection means of the sling, which may for that purpose for instance comprise an eye or a ring which is sized such that the hook fits into it.

The receptor may be equipped with a positioning means realized to compel the connection means of the sling into a predefined interlocking orientation. For instance, such positioning means may be magnetic (e.g. electromagnetic) in order to be able to switch off the magnetism if that is not necessary or may even interfere with other elements of the blade gripping tool and/or blade gripping device) if the connection means of the sling is also magnetic. The receptor may comprise an ELEBIA hook (a hook assembly equipped with a magnet). An ELEBIA hook is a hook assembly equipped with a magnet which can attract (i.e. pull) and orientate the connection means of the sling such as a metal ring and with a motor which moves (automatically or remote controlled or via a push button control) the hook of the hook assembly into an open position. When the connection means has been attracted to a stationary part of the hook assembly, the hook is moved into the closed position in which it interconnects with the connection means such that it firmly holds it until moved into the open position.

The sling-receiving element may also be connected to and/or comprises a number of adjustment means realized to adjust the position and/or orientation and/or size of the sling receiving element.

In other words, the sling-receiving element is realized and/or positioned flexibly. This way the sling-receiving element can be adjusted and/or positioned variably dependent on the size and/or orientation of the rotor blade which is to be held by the blade gripping tool, in particular by the sling which is placed partially around the rotor blade.

The adjustment means may be connected to the sling-receiving element and comprise elements such as a movement mechanism to alter the position of the entire sling-receiving element. According to an exemplary embodiment of the embodiment 2, the adjustment means comprise a hinge mechanism. That means that the sling-receiving element is hingedly connected to other parts of the blade gripping tool such that it can be tilted along a tilting axis in a tilting direction that defines a tilting plane. Thereby, that tilting plane is co-planar with or parallel to the two-dimensional path of travel. That way, the sling-receiving element can be tilted towards and/or away from the rotor blade when the latter is positioned within the blade gripping tool. This way, the sling-receiving element does not stand in the way of the rotor blade while the rotor blade is introduced into the blade gripping tool and can then be tilted closer to the rotor blade when the blade gripping tool is in the closed position. Such hinge may be combined with an actuator such as a spring so that an automatic tilting movement of the sling-receiving element is possible.

On the other hand, the adjustment means may also (additionally or alternatively) be comprised by the sling-receiving element itself. Thereby the adjustment means may comprise a telescopic assembly realized to bring the sling-receiving element into a designated operating position of the device. This implies that not the complete sling-receiving element will be raised or lowered, but only parts thereof, in particular the receptor of the sling-receiving element. The telescopic assembly operates in an extension plane which is co-planar with or parallel to the two-dimensional path of travel for the reasons described above with reference to the tilting mechanism. A telescopic assembly can generally serve to adapt the dimensions of the sling-receiving element to the size of the rotor blade to be accommodated and held by the blade gripping tool.

The sling is held within the tool such that it is automatically driven into and/or kept by an actuator system in a safe position. Such automatic transport into a safe position may for instance be realized as an automatic emergency retraction system to transport the sling back into an embedded (or retracted) position if the sling is not connected to either the sling-conveying element or the sling-receiving element. Such emergency retraction system thereby helps to prevent the sling from hanging somewhere loose and standing or hanging in the way of other, movable parts of the blade assembly. Another example of such actuator system is a mechanism which actively hinders a release of the sling from both the sling-conveying element and the sling-receiving element if the actuator system (or to be more precise: a force sensor comprised by the actuator system) does not sense any burden on the sling. Again, this prevents the sling from hanging about loosely. Another example of such actuator system is an emergency release system of a supply element which supplies the sling so that the sling can be pulled out of the supply system. An actuator (again comprising a force sensor) will automatically completely or partly release the sling from the supply element, for instance if it is sensed that the sling is stuck somewhere within or about the blade gripping tool. Such embodiment of the embodiment 2 can be realized for instance by the supply element being a drum (or barrel) with a pin around which an end part of the sling (in fact the end part of the sling opposite its connection means) is wound or otherwise fastened. If the actuator pulls out the pin, the sling is released to be torn out of the drum very easily.

The embodiment 2 may also concern a blade gripping tool, in particular realized with any of the elements and/or features of the embodiment 2 which have been described above, for a blade gripping device for gripping a rotor blade, in particular a rotor blade of a wind turbine, whereby the blade gripping tool is tiltable about a horizontal axis which axis is parallel to a principal longitudinal axis of the rotor blade when held in a designated gripping position by the tool. That means that the rotor blade, when held by the blade gripping tool, can be tilted together with the blade gripping tool in order to position it such that it can be transported and/or assembled much easier. For instance, the rotor blade may fit much better into the blade gripping device by that measure and/or may be aligned beforehand at a desired pitch angle to be connected easier to a hub of a rotor of a wind turbine.

In this context, a blade gripping device according to the embodiment 2 may comprises a number of these above-mentioned blade gripping tools and further that several or all, blade gripping tools of such blade gripping device are realized such that they are tiltable along the same horizontal axis. This way, an overall tilting mechanism for the rotor blade is realized.

BRIEF DESCRIPTION

Some of the embodiments will be described in detail, with reference to the following figures, wherein like designations denote like members, wherein:

FIG. 19 shows a perspective view of a third example of a receptor of a gripping tool;

FIG. 20 shows a section view of the same receptor as in FIG. 19 in a first position;

FIG. 21 shows the same section view of the same receptor as in FIGS. 19 and 20 in a second position;

FIG. 22 shows the same section view of the same receptor as in FIGS. 19 to 21 in a third position; and FIG. 23 shows the same section view of the same receptor as in FIGS. 19 to 22 in a fourth position.

DETAILED DESCRIPTION

Figure 1:
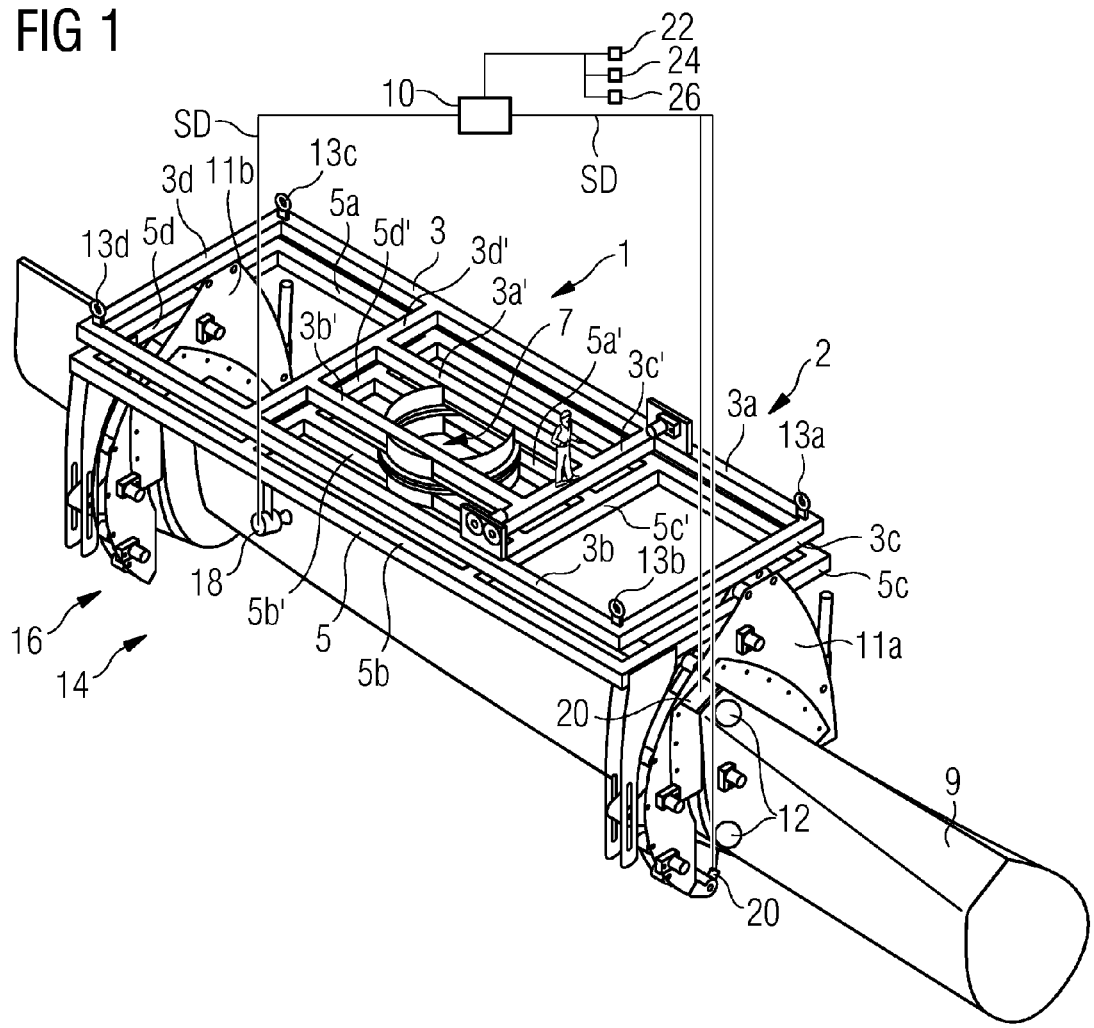
FIG. 1 shows a perspective view of a first embodiment of a blade gripping device with a rotor blade of a blade assembly.
Figure 2:
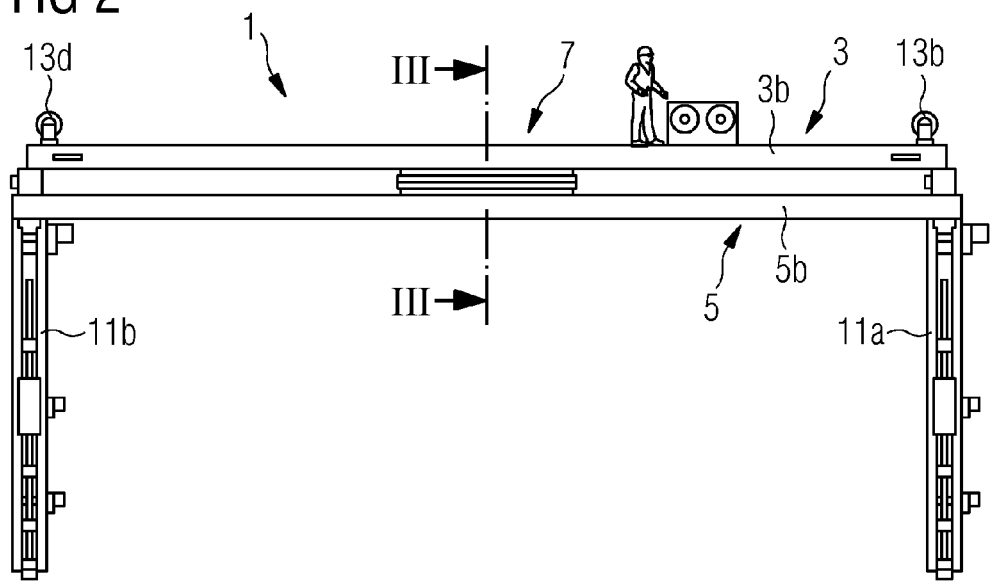
FIG. 2 shows a side view of the same blade gripping device without the rotor blade.

FIGS. 1 and 2 show a blade gripping device 1 according to a first embodiment of the invention. It grips a rotor blade 9 of a wind turbine (not shown). The blade gripping device 1 comprises a first frame 3 and a second frame 5 which are interconnected via a swivel connection 7. The first, upper, frame 3 comprises an essentially rectangular, namely oblong shape which is defined by a first outer longitudinal beam 3a and a parallel second outer longitudinal beam 3b and a first outer cross beam 3c and a second outer cross beam 3d parallel to the first outer cross beam 3c, which beams 3a, 3b, 3c, 3d are connected to each other at corners of the first frame 3. In addition, the first frame 3 comprises in its middle part two parallel inner cross beams 3c', 3d' which have essentially the same length as the first and second outer cross beams 3c, 3d, to which they are parallel, and two parallel inner longitudinal beams 3a', 3b' which are parallel to the two outer longitudinal beams 3a, 3b but only have about half the length of the latter or less. The inner longitudinal beams 3a', 3b' interconnect the two inner cross beams 3c', 3d' to form a support frame for the swivel connection 7.

The second, lower, frame 5 is correspondingly shaped as the first frame 3. In fact, they are of the same make, i.e. identical frames 3, 5 inasmuch as the beam structure is concerned. Therefore, the numbering of the beams 5a, 5b, 5c, 5d, 5a', 5b', 5c', 5d' of the second frame 5 corresponds directly to the numbering of the beams 3a, 3b, 3c, 3d, 3a', 3b', 3c', 3d' of the first frame 3 with respect to their position (which is simply a vertical downwards projection of the latter beams 3a, 3b, 3c, 3d, 3a', 3b', 3c', 3d') and dimensions and also with respect to their mechanical function within the frames 3, 5. The function of the frames 3, 5 is however a different one which is why the first frame 3 is equipped with upwards projecting connectors 13a, 13b, 13c, 13d at its corners (i.e. where the outer beams 3a, 3b, 3c, 3d are connected to each other), whereas the second frame 5 comprises a blade gripping assembly 16 which faces downwards and which comprises two blade gripping tools 11a, 11b which project downwards rectangularly from the second frame 5 to which they are permanently connected.

In this context, it is to be understood that the blade gripping device 1, which forms a blade assembly 2 together with the rotor blade 9, is shown in both depictions in a designated operating position: That means that both frames 3, 5 are essentially horizontally aligned which can be realized by suspending the blade gripping device 1 via the connectors 13a, 13b, 13c, 13d from a lifting device such as a crane (not shown) with ropes or chains (not shown) which each have the same length from the connectors 13a, 13b, 13c, 13d to a common interconnection point, e.g. the lifting device's hook. Such horizontal alignment of the blade gripping device 1 results also in an essentially horizontal alignment of the rotor blade 9.

Specifically in FIG. 1, there can also be seen a sensor arrangement 14 which comprises a number of sensors 18, 20 and a position computation unit 10 as a recognition unit 10, as well as a number of position adjustment assistance means 22, 24, 26:

A first sensor 18 positioned about the support frame of the second frame 5 and facing downwards towards the rotor blade 9 comprises a camera sensor 18 which operates at a wavelength perceptible to the human eye. This camera sensor 18 thus produces pictures or movies of the rotor blade 9 during the process of advancing the blade gripping device 1 to the rotor blade 9 and during the connection process of the rotor blade 9 to the blade gripping device 1. These pictures or movies are used as sensor data SD which are transferred wirelessly or via communication lines to the position computation unit 10 which therefrom computes a specific position of the rotor blade 9, for instance a position of the rotor blade 9 relative to the blade gripping device 1. Similarly, a set of second sensors 20 are realized to detect a magnetic field. For that purpose, the second sensors 20 comprise Hall effect sensors 20. They interact with magnetic markers 12 of the rotor blade 9. Again, the sensor data SD of the second sensors 20 are transferred to the position computation unit 10 which therefrom computes a specific position of the rotor blade 9, for instance a position of the rotor blade 9 relative to the blade gripping device 1.

The position adjustment assistance means 22, 24, 26 comprise a display 22 which in particular can display the pictures and/or movies from the first sensor 18, an acoustic and/or optical signal generating unit 24 which outputs sound and/or light signals which signals are representative of the detected position and an automatic movement mechanism 26. Such automatic movement mechanism 26 automatically moves the blade gripping tools 11a, 11b into a predefined gripping position with respect to the rotor blade 9.

To sum up, by means of the sensor arrangement 14 it is possible to compute the position of the blade gripping device 1 relative to the rotor blade 9 and to further assist an operator and/or the automatic movement mechanism 26 to move the blade gripping device 1 and/or parts thereof, in particular the second frame 5 relative to the rotor blade 9 in order to put it into a position in which the blade gripping tools 11a, 11b can grip the rotor blade 9 in a desired position. Such position is such that the centre of gravity of the rotor blade 9 is essentially below the centre of gravity of the blade gripping device 1.

Figure 3:
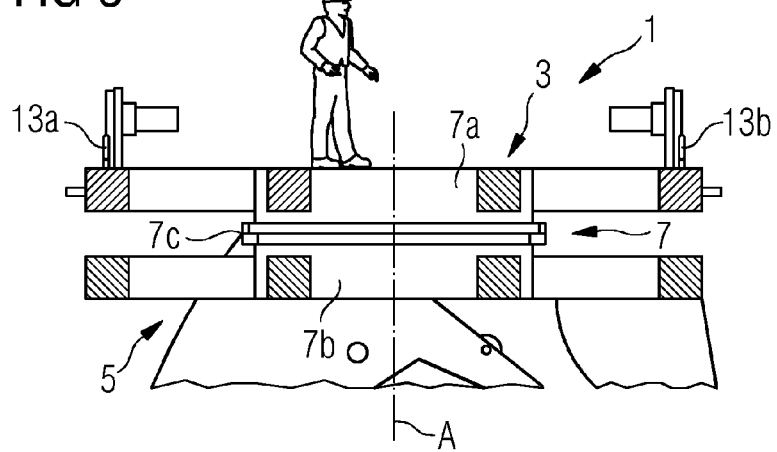
FIG. 3 shows a section view of the same blade gripping device along a section line III-III of FIG. 2.

FIG. 3 shows a section view of FIG. 2 which serves to explain in more detail the functions of the swivel connection 7. The swivel connection 7 comprises a yaw ring 7c and an upper ring part 7a and a lower ring part 7b. The upper ring part 7a is connected to the support frame of the first frame 3 whereas the lower ring part 7b is connected to the support frame of the second frame 5.

By means of the swivel connection 7, the second frame 5 can be rotated, i.e. yawed along a vertical axis A relative to the first frame 3 (and vice versa the first frame 3 can be rotated relative to the second frame 5). This permits to align the longitudinal axis of the second frame 5 with the longitudinal axis of the rotor blade 9. Once the blade gripping device 1 is placed essentially above the rotor blade 9, it can be lowered and the second frame 5 can be yawed such that the two above-named horizontal axes are vertical projections of each other. Then, the blade gripping tools can be activated to grip the rotor blade 9 and hold it firmly. After that, the blade gripping device 1 can be lifted to carry away the rotor blade 9.

Figure 4:
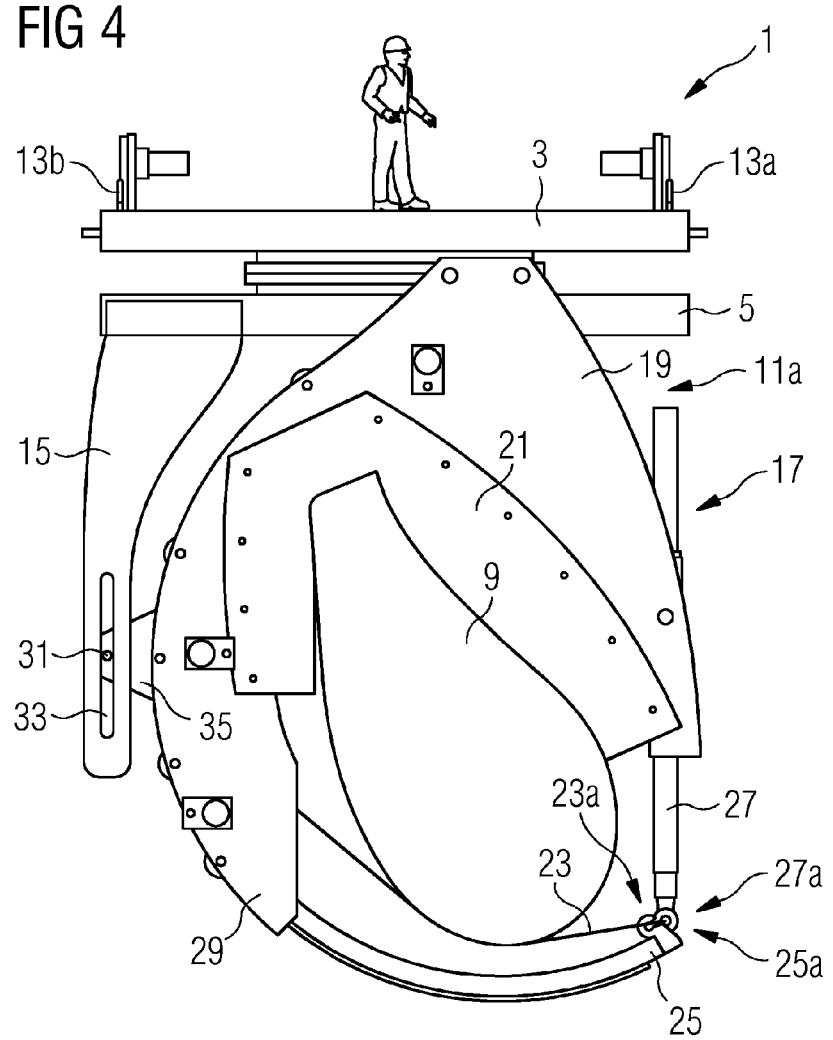
FIG. 4 shows a front view of the same blade gripping device in a first position.
Figure 5:
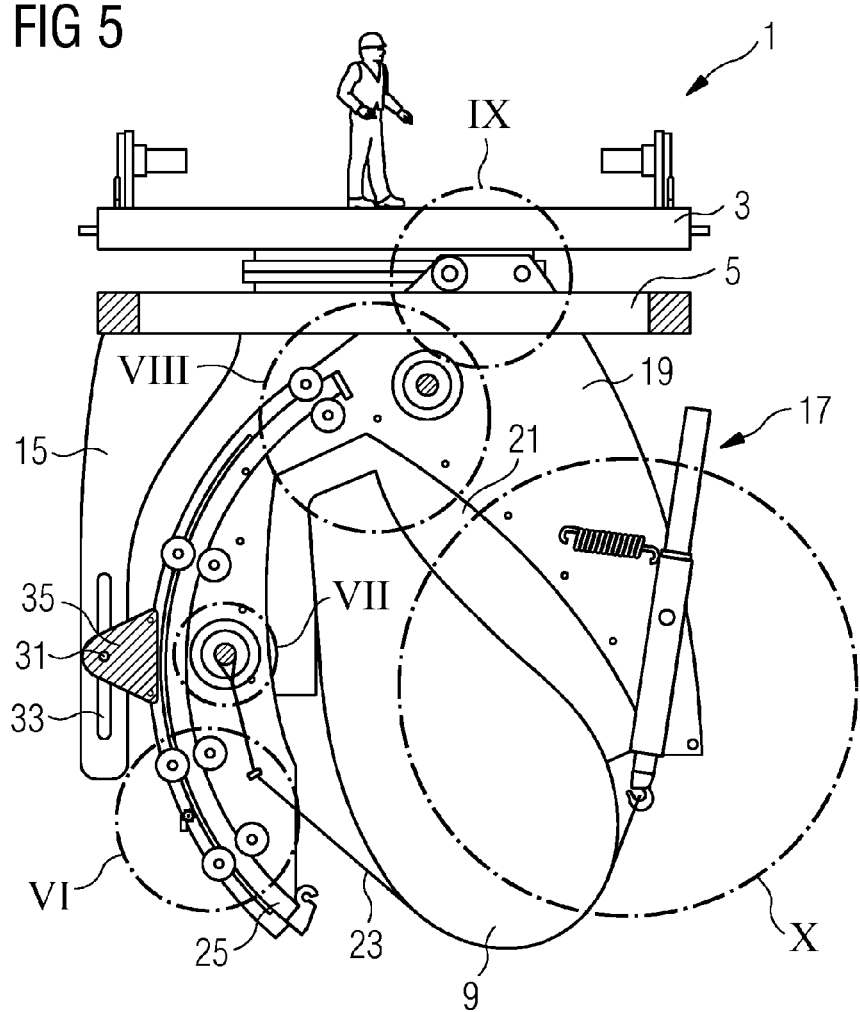
FIG. 5 shows a front view of the same blade gripping device in a second position.

FIGS. 4 and 5 show a front view and an inside view of the same blade gripping device 1. In particular, the blade gripping tool 11a (in the context of the invention) can be seen in more detail. The blade gripping tool 11a comprises a seat 21 to accommodate the rotor blade 9 in its upward directed part of its circumference. The seat 21 is firmly connected to a frame 19 which frame 19 accommodates a sling handover mechanism 17. The sling handover mechanism 17 comprises a sling-conveying element 25 at one side of the rotor blade 9 and a sling-receiving element 27 at the opposite side of the rotor blade 9 along its circumference. Further the sling handover mechanism 17 comprises a sling 23. The sling-conveying element 25 and the sling 23 are retractable into an accommodation section 29 of the frame 19. The sling-conveying element 25 has a curved shape which is essentially a circular shape, i.e. formed as a part of a circle. It comprises a single-piece guidearm 25 and an engaging element 25a to which there is connected a connection means 23a of the sling 23. The connection means 23a comprises an end ring 23a of the sling 23 which is connected to the sling 23 at one of its ends. Correspondingly, the sling-receiving element 27 comprises a receptor 27a realized as a hook 27a.

At the left, the blade gripping tool 11a comprises a guiding frame 15 with a guiding cavity 33 which interacts with a pin 31 of a guiding element 35. That guiding element 35 is firmly connected to the frame 19.

Details of many of the above-described elements will be described with reference to the detailed drawings in FIGS. 6 to 10 and 12. In the context of FIGS. 4 and 5 it may be noted that the guidearm 25 of the sling-conveying element 25 is positioned in a handover position in FIG. 4 whilst it is shown in a retracted position in FIG. 5. Correspondingly, the sling 23 is con-connected to the engaging element 25a of the sling-conveying element 25 by the connection means 23a of the sling 23 and currently being handed over to the receptor 27a of the sling-receiving element 27. That means, the sling 23 has been moved along a two-dimensional path of travel from the one side of the rotor blade 9 (i.e. the left) below the rotor blade 9 to its opposite side. The sling 23 thereby serves to firmly grip the rotor blade 9 together with the seat 21. In FIG. 5, the handover of the sling 23 has been accomplished and the guidearm 25 is retracted. The sling-receiving element 27 with its receptor 27a has received the connection means 23a of the sling 23 and holds it firmly. The sling-receiving element 27 has also been moved further upwards in order to pull the sling 23 further up and to thus increase the gripping force by the sling 23 on the rotor blade 9. Functional details of this procedure will also be described below.

Figure 6:
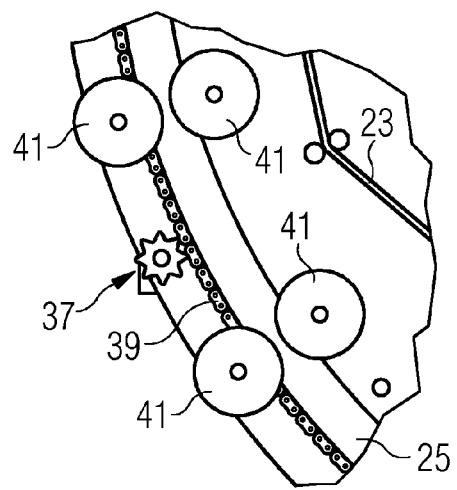
FIG. 6 shows a first detailed view of FIG. 5.

As for FIG. 6, this shows a detail VI of FIG. 5. The curved guide arm 25 of the sling-conveying element 25 is guided by a guiding mechanism which is comprised of a number of rollers 41 at either side of the guidearm 25. Via a sprocket 37 and a chain 39 which is welded (or otherwise permanently connected) to the guidearm 25 at its left side (i.e. its underside) the guide arm 25 can be driven by an electric motor (not shown) into and out of the accommodation section 29 of the frame 19.

Figure 7:
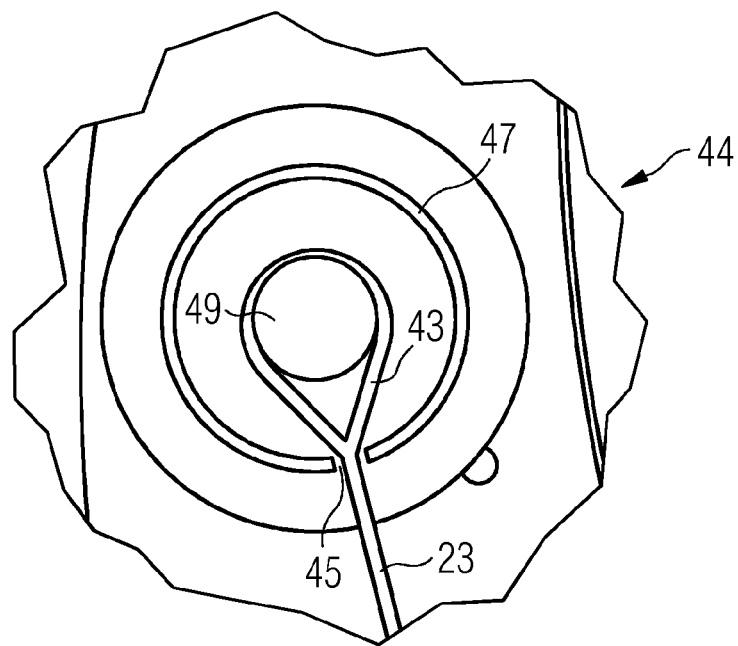
FIG. 7 shows a second detailed view of FIG. 5.

Turning to FIG. 7, this shows a detail VII of FIG. 5. The sling 23 is guided with its other end 43 (i.e. that end 43 which is opposite the end ring 23a) into a drum 47 which drum 47 is equipped with an inlet gap 45. The end 43 of the sling 23 is realized as a loop end 43 and thereby suspended at a retractable centre pin 49 inside the drum 47. The drum 47 with the centre pin 49 constitute a sling-holding assembly 44 which is also equipped with an actuator (not shown) to turn the drum 47 in a clockwise and/or anti-clockwise direction and to thus wind and/or unwind the sling 23. Such actuator may for instance comprise a spring and/or an electric and/or hydraulic motor.

Figure 8:
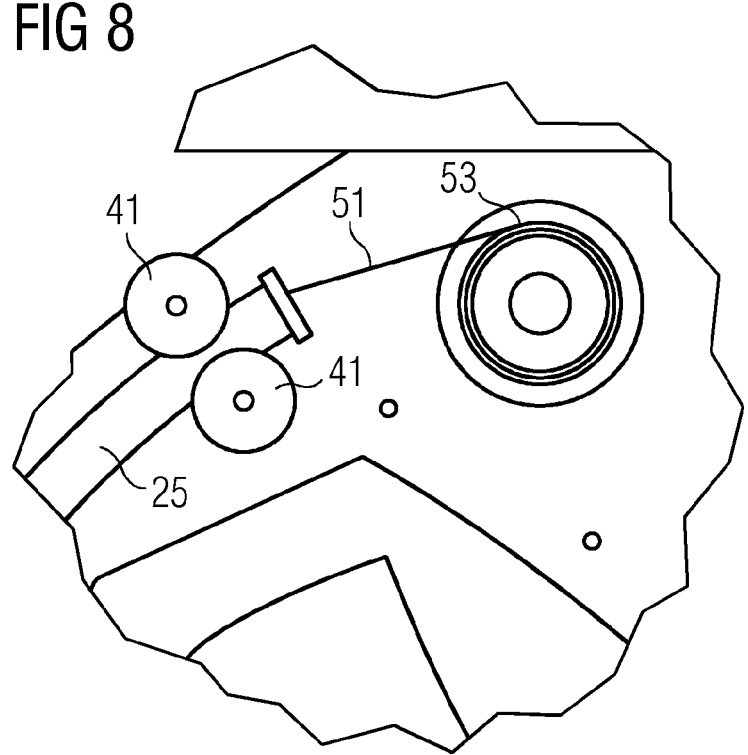
FIG. 8 shows a third detailed view of FIG. 5.

FIG. 8 shows a detail VIII of FIG. 5, namely an emergency retraction winch 53 realized to wind up a wire 51 which is connected to the end of the guidearm 25 opposite of the engaging element 25a of the sling-conveying element 25. The emergency retraction winch 53 (which is, again, connected to a suitable actuator such as an electric and/or hydraulic motor and/or a spring) serves to retract the guidearm 25 in cases in which the motor that drives the sprocket 37 fails or does not have sufficient power to retract the guidearm 25.

Figure 9:
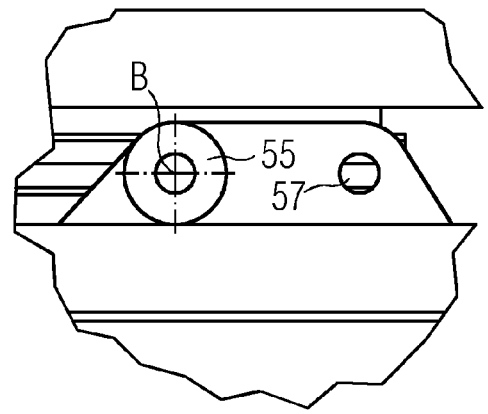
FIG. 9 shows a fourth detailed view of FIG. 5.

FIG. 9 depicts in detail IX of FIG. 5 the suspension of the frame 19 at the second frame 5. The frame 19 is suspended at the second frame 5 by means of a main load carrying wheel 55 the horizontal axis B of which is a hinge axis for a tilting movement of the frame 19 and thus of the blade gripping tool 11a. This way, the rotor blade 9 can be pitched along the horizontal axis B to a certain extent, namely about an angle of about 25°, from −5° to 20°. For instance, in FIGS. 4 and 5 the rotor blade 9 is held at a pitch angle of about 5° of a predefined blade coordinate system. In order to fix the pitch angle at a certain value, an opening 57 of the frame 19 at about the same horizontal level is provided, through which opening 57 a fixation spindle (not shown) can be inserted to engage with the second frame 5 and then to define the pitch angle of the blade gripping tool 11a and thus indirectly of the rotor blade 9.

Figure 10:
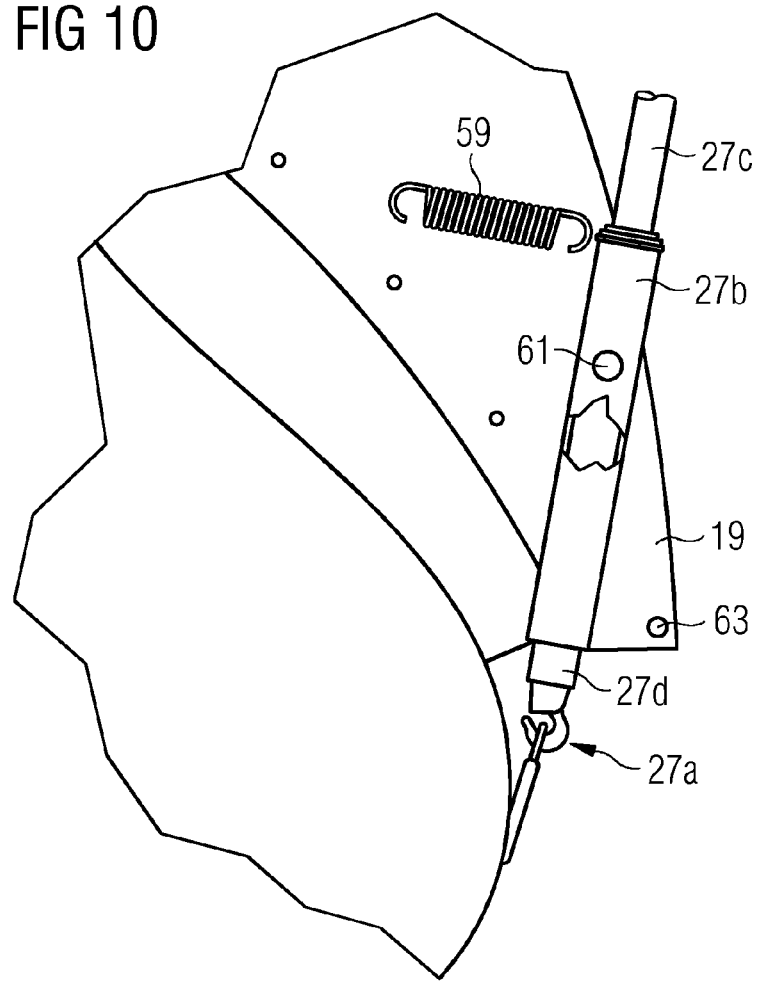
FIG. 10 shows a fifth detailed view of FIG. 5.

FIG. 10 shows a detail X of FIG. 5, namely the sling-receiving element 27 and its surroundings. The sling-receiving element 27 comprises a receptor 27a realized as an ELEBIA hook (a hook assembly equipped with a magnet) 27a (cf. above for explanation) and with a protection guide 27d for that ELEBIA hook (a hook assembly equipped with a magnet) 27a. Further the sling-receiving element 27 is realized as a telescopic assembly with an outer tube 27b and an inner tube 27c which can be moved inside the outer tube 27b so as to move the receptor 27a essentially upwards and/or downwards to allow for the movement of the connection means 23a of the sling 23 as explained with reference to FIGS. 4 and 5. Further, the sling-receiving element 27 is hingedly connected to the frame 19 via a pivot suspension 61. A spring 59 serves to pull the upper end of the sling-receiving element 27 towards the rotor blade 9 and thus its lower end away from the rotor blade 9 to increase the gripping force of the sling 23 on the rotor blade 9. A head stop 63 serves to stop the tilting movement of the sling-receiving element 27 which is induced by the spring 59 at a predefined stop position, i.e. in order not to over-tilt the sling-receiving element 27.

Figure 11:
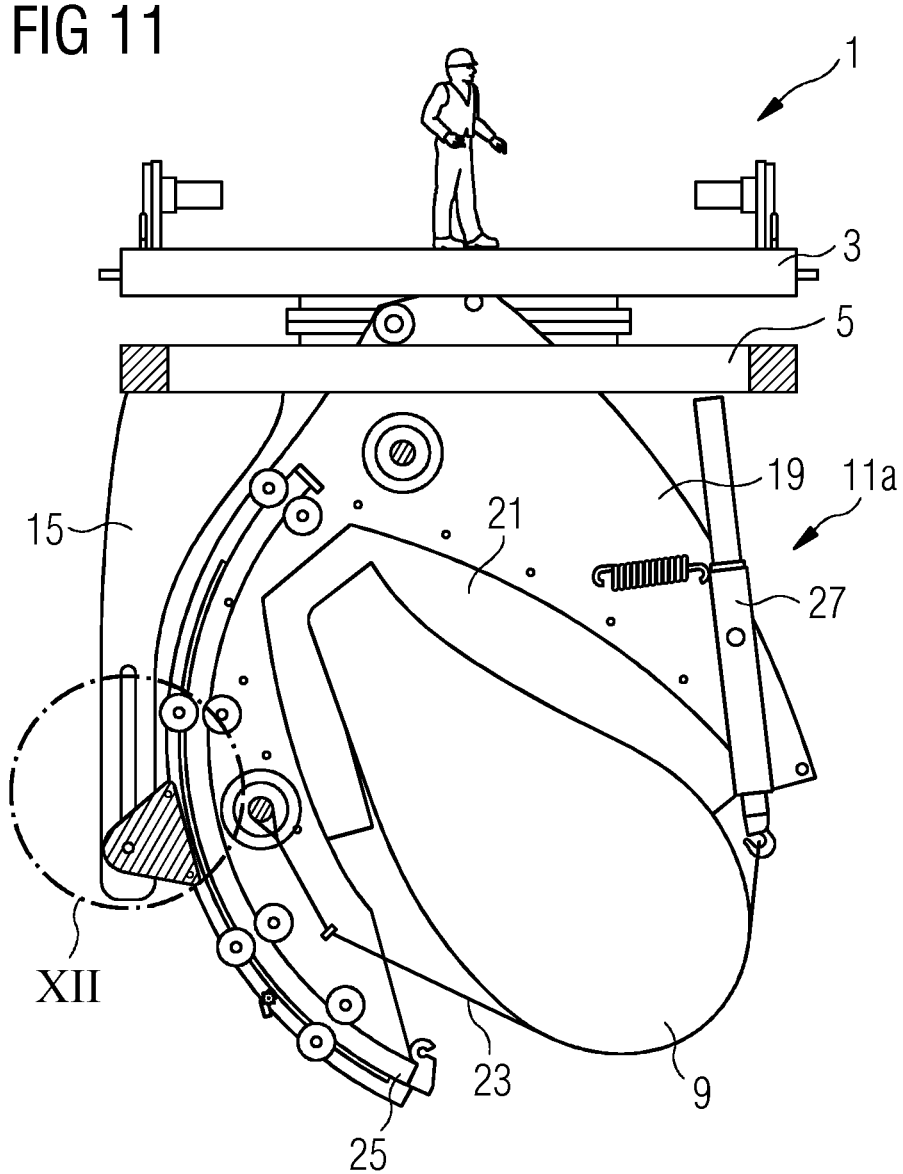
FIG. 11 shows an inside view of the same blade gripping device with the same perspective as that of FIG. 5.
Figure 12:
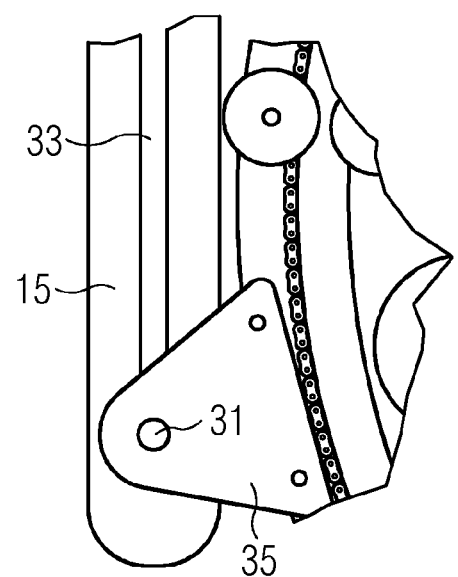
FIG. 12 shows a detailed view of FIG. 11.

FIG. 11 shows the same blade gripping device 1 at a different position, namely a different pitch angle, which is here at −20° with reference to the rotor blade's 9 predefined blade coordinate system. This figure is described with reference to the detail XII of FIG. 12. As explained with reference to FIG. 9, the blade gripping tool 11a can be tilted along the horizontal axis B defined by the axis B of the main load carrying wheel 55. In order to support and control this tilting movement and/or position, use is made of the guiding frame 15 with its guiding cavity 33 which interacts with the pin 31 of the guiding element 35. In comparison of FIGS. 11 and 12 with FIGS. 4 and 5 it can be observed that the guiding element 35 is positioned at the extreme low end of the guiding cavity 33 whereas in FIGS. 4 and 5 the guiding element 35 is vertically about the middle of that guiding cavity 33. The frame 19 can thus be tilted by moving (e.g. motor-driven) the guiding element 35 upwards and/or downwards along the guiding cavity 33 by which measure the main load carrying wheel 55 is moved left (when the guiding element 35 is moved downwards) or right (when the guiding element 35 is moved upwards). This allows for an overall very stable tilting mechanism of the blade gripping tool 11a and thus of the rotor blade 9.

Figure 13:
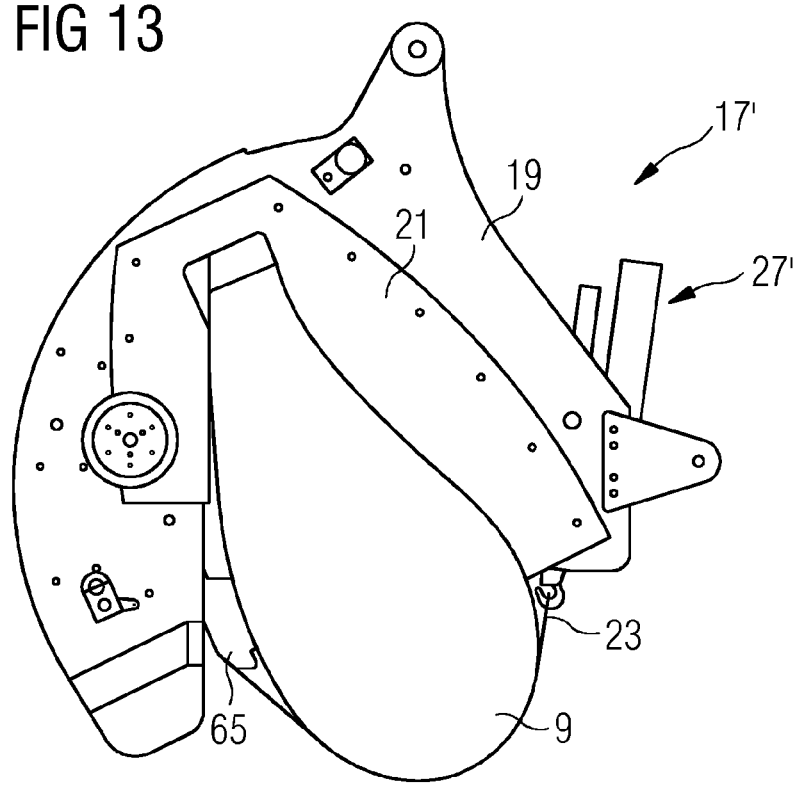
FIG. 13 shows a view of a part of a blade gripping tool according to a second embodiment.
Figure 14:
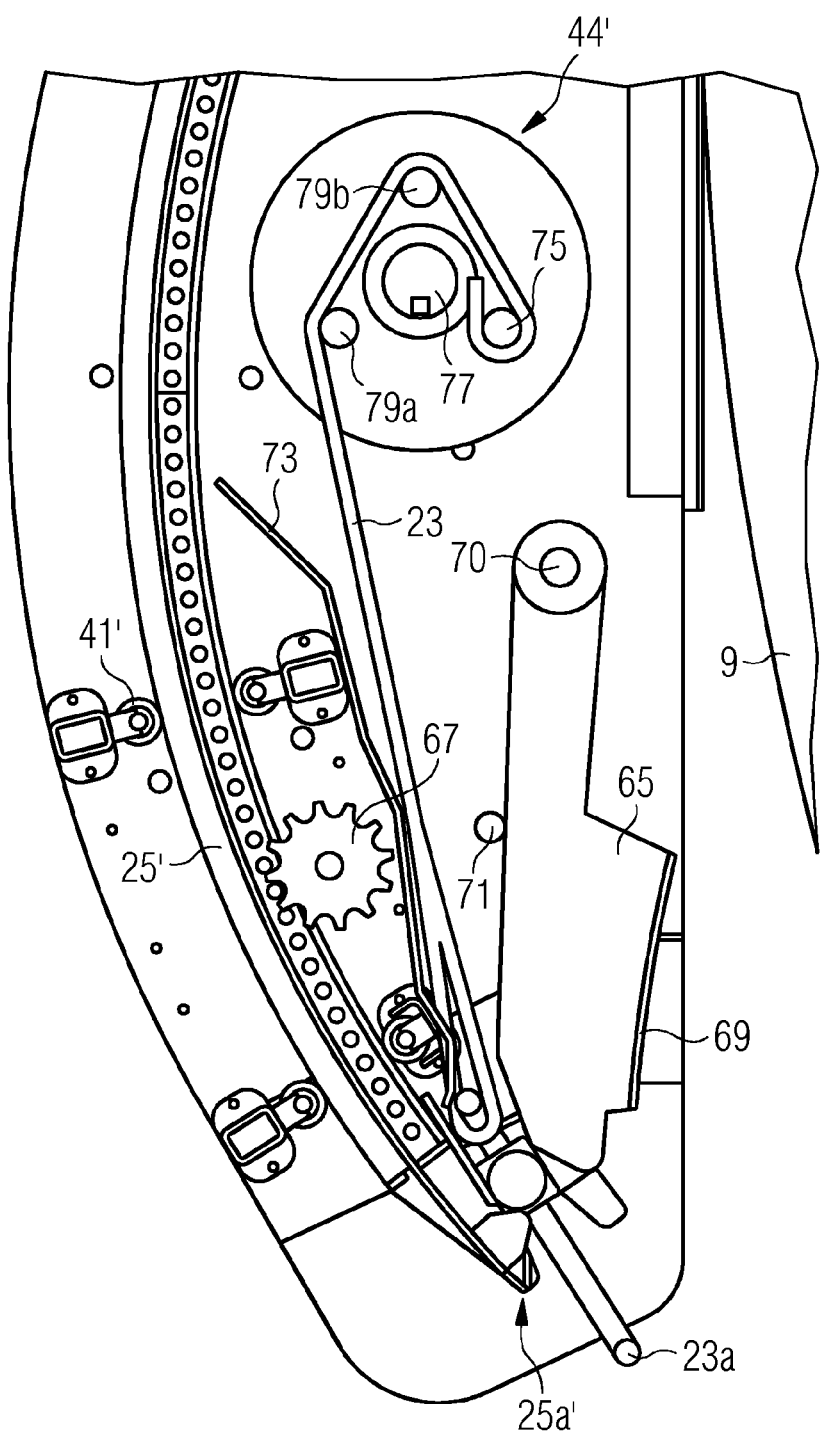
FIG. 14 shows an inside view of the same blade gripping tool as in FIG. 13.

FIGS. 13 and 14 show a second embodiment of a sling handover mechanism 17'. Most of its elements correspond directly with those of the embodiment explained with reference to FIGS. 1 to 12, so that only different elements will be described here. A first difference is the sling-receiving element 27' which is here realized to comprise a hydraulic actuator right aside the other (known) parts of the sling-receiving element 27 according to the previous embodiment. Another difference is a hinged guidance shoe 65 with a soft and flexible contact surface 69 to the rotor blade 9. When looking at the inside view of FIG. 14 the function of this guidance shoe 65 becomes clearer:

Whereas the guidance shoe 65 is in a contact position with the rotor blade in FIG. 13, it is tilted back via a tilting axis 70 (assisted by an actuator, e.g. a spring—not shown) into a retracted position corresponding to an open position of the sling handover mechanism 17'. A stopper 71 stops that retraction movement of the guidance shoe 65 at that retracted position.

The guidance shoe 65 serves a threefold function: Firstly, it holds the sling 23 at a predefined position when the sling 23 is held by the sling-receiving element 27. Secondly (cf. FIG. 13), it provides an extra gripping force on the rotor blade 9 from the left side via its contact surface 69. Thirdly, when the sling 23 is retracted, it automatically leads the connection means 23a of the sling towards the engaging element 25a' of the sling-conveying element 25'.

The sling conveying element 25' and its guiding mechanism with rollers 41' is realized slightly different from the previous embodiment. Firstly, the guidearm 25' comprises a rail with an upper chain which engages with a sprocket 67 at the right hand side (rather than the left). Secondly, the rollers 41' have a different shape, but are aligned correspondly to the first embodiment.

Further, the guidearm 25' is separated from the sling 23 by a separation element 73. In addition, a different sling-holding assembly 44' is realized. It comprises a wheel 77 to wind up the sling 23 which is attached to a decentralized first (again retractable—cf. above) pin 75 and led further via two more decentralized pins 79a, 79b.

Figure 15:
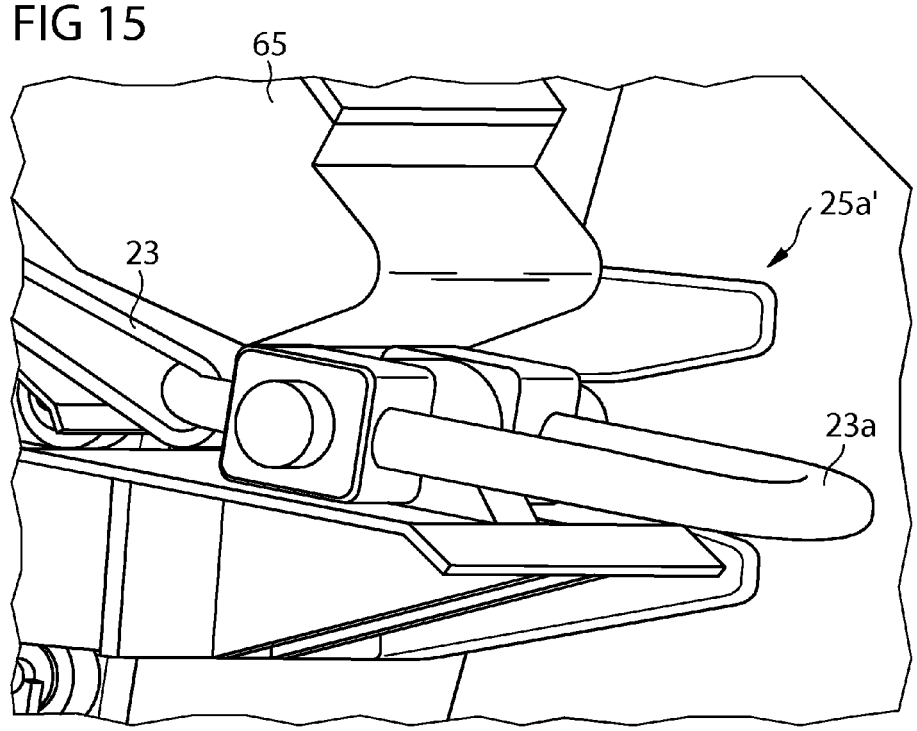
FIG. 15 shows a detailed view of a second example of a sling and of a sling-conveying element of a gripping tool.
Figure 16:
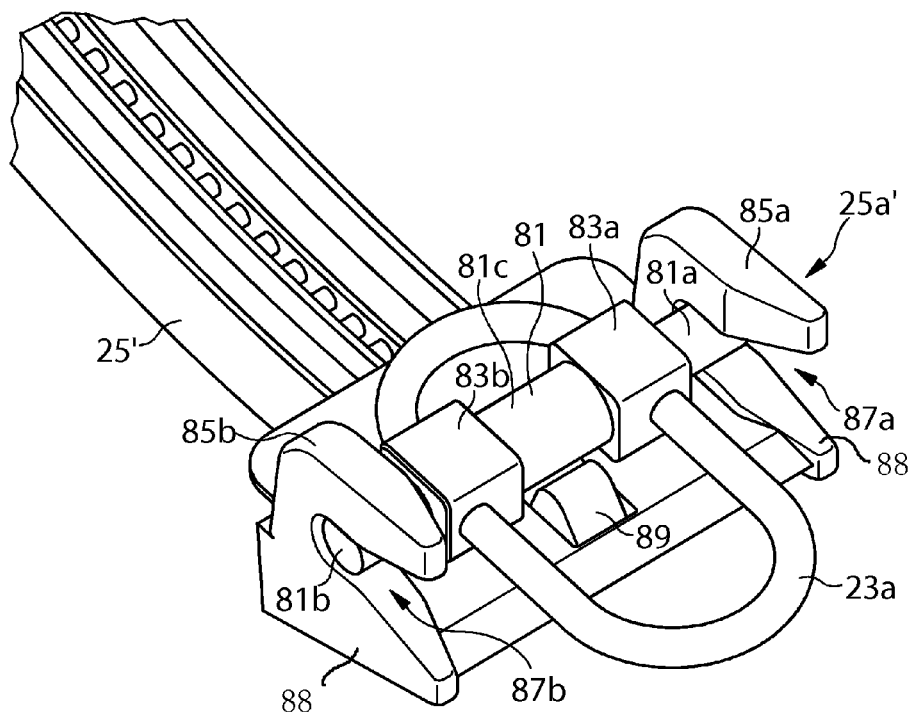
FIG. 16 shows a perspective view of the same sling-conveying element as shown in FIG. 15 with parts of the sling.

As for the automatic connection of the connection means 23a to the engaging element 25a' reference is made to FIGS. 15 and 16. As can be seen in FIG. 15, the guidance shoe 65 in its retracted position presses the sling 23 and thus particularly its connection means 23a towards the engaging element 25a'. The connection of the engaging element 25a' and the connection means 23a (without the sling 23) is shown in FIG. 16.

The connection means 23a comprises a ring attached to a pin 81 via two connectors 83a, 83b, the cross-sectional dimension of which is bigger than that of the pin 81 and of the ring of the connection means 23a. The pin 81 can thus be divided into a first section 81a projecting away from the right (in FIG. 16) of the ring, a second section 81b projecting away from the left of the ring and an inner (wider) section 81c interconnecting the two connectors 83a, 83b.

The engaging element 25a' is formed of a base plate 88 from which there project two L-shaped holders 85a, 85b in an upwards and then further parallel direction to the main extension of the base plate 88. The holders 85a, 85b thus form two inlet openings 87a, 87b between the base plate 88 and their legs which are essentially parallel to the base plate 88.

When the connection means 23a is pressed by the guiding shoe 65 towards the engaging element 25' its first and second sections 83a, 83b are automatically led into the inlet openings 87a, 87b whereas the connectors 83a, 83b hold the connection means 23a in a centre position in between the two holders 85a, 85b.

Further, in order to control the release of the connection means 23a from the engaging element 25', the engaging element 25' comprises a spring based locking nose 89 within the base plate 88 which is forced upwards, i.e. towards the connection means 23a, by its spring. Once the connection means 23a has been led into the position shown in FIGS. 15 and 16, the locking nose 89 prevents an accidental sliding out of the connections means 23a from the engaging element 25'.

Figure 17:
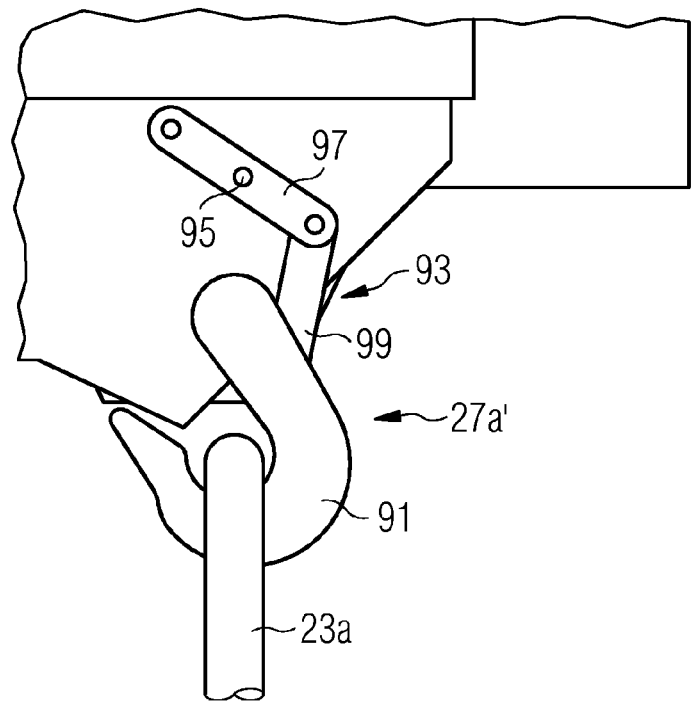
FIG. 17 shows a side view of a second example of a receptor of a gripping tool in the context of an embodiment.
Figure 18:
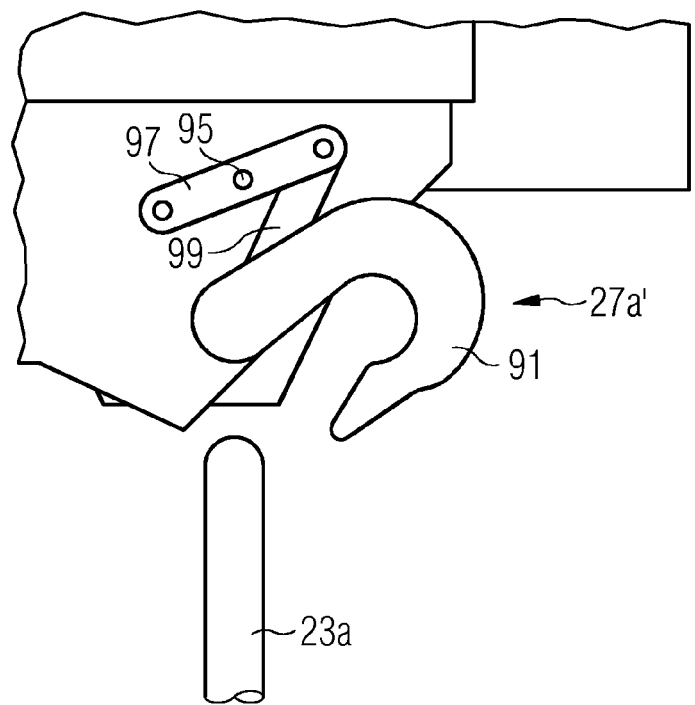
FIG. 18 shows the same side view of the same receptor as shown in FIG. 17 in a second position.

FIGS. 17 and 18 show a second example of a receptor 27a' of a blade gripping tool (in the context of the invention). It comprises a tiltable hook 91 hingedly connected to movement mechanism 93. The movement mechanism 93 comprises a first hinge arm 97 suspended via a first hinge axis 95 and hingedly connected to a second hinge arm 99 which second hinge arm 99 is connected to the hook 91. By tilting the first hinge arm 97 along its hinge axis 95 such that it moves the second hinge arm 99 upwards, the hook 91 is automatically transferred into an open position (FIG. 18) whereas by moving the first hinge arm 97 in the reverse direction, the hook 91 is automatically transferred into a closed position to hold firmly the connection means 23a.

FIGS. 19 to 23 show a third example of a receptor 27a" of a blade gripping tool 11a, 11b in the context of an embodiment according to the invention. It comprises a receptor element 101 for receiving the connection means 23a and a receptor pin 103 which is tiltable along a receptor hinge 105.

FIGS. 20 to 23 show the reception and release process of the connection means 23a within the receptor 27a". In FIG. 20, the connection means 23a is pushed in an upward direction U into the receptor element 101 up to a stop surface 107 of the receptor element 101 (which receptor element 101 comprises a cavity 109 into which the connection means 23a fits sizewise and formwise). The receptor pin 103 is here in a horizontal alignment and will be tilted along its receptor hinge 105 in an opening tilting direction $T_1$.

FIG. 21 shows the connection means 23a in its uppermost position, i.e. while hitting the stop surface 107. The receptor pin 103 has been moved into an essentially upright position and gave way to the connection means 23a on its way upwards. Due to its weight and/or assisted by an actuator such as a spring the receptor pin 103 then moves in the counter direction of the opening tilting direction $T_1$, i.e. in a closing tilting direction $T_2$ (cf. FIG. 22). Thereby, it blocks a downward movement D of the connection means 23a and thus holds the connection means 23a firmly. FIG. 23 shows the opening mechanism: the receptor pin has been (automatically) tilted into the opening tilting direction $T_1$ again, and the connection means 23a can be moved out in the downward direction D of the receptor element 101.

Although the present invention has been disclosed in the form of preferred embodiments and variations thereon, it will be understood that numerous additional modifications and variations could be made thereto without departing from the scope of the in-invention.

For the sake of clarity, it is to be understood that the use of 'a' or 'an' throughout this application does not exclude a plurality, and 'comprising' does not exclude other steps or elements.

The invention claimed is:

1. A blade gripping device for gripping a rotor blade of a wind turbine, said rotor blade having multiple pitch angles along its axis, said blade gripping device comprising:
a blade gripping assembly with at least one frame and a number of blade gripping tools, including a movable seat which has a portion which conforms to a rotor blade, a sensor arrangement realized to sense a specific feature of the blade, and a position computation unit to compute a pitch angle of the rotor blade, whereby the position computation unit is configured to orientate the seat relative to the frame in a blade gripping manoeuvre to orient the seat to the computed pitch angle of the rotor blade along the horizontal axis.

2. The device according to claim 1, whereby the sensor arrangement comprises at least one sensor realized to detect a specific shape of the rotor blade.

3. The device according to claim 1, whereby the sensor arrangement comprises at least one sensor realized to detect a specific position of the rotor blade relative to the device.

4. The device according to claim 3, whereby the sensor is realized to detect a marker of the rotor blade.

5. The device according to claim 4, whereby the marker comprises a magnetic marker.

6. The device according to claim 1, whereby the sensor arrangement comprises at least one optical sensor.

7. The device according to claim 6, whereby the at least one optical sensor comprises a camera, which operates in an optical wavelength perceptible to the human eye.

8. The device according to claim 6, whereby the at least one optical sensor comprises a laser sensor.

9. The device according to claim 1, whereby the sensor arrangement comprises at least one sensor realized to sense a magnetic field.

10. The device according to claim 1, whereby the sensor arrangement the position computation unit is realized to compute a specific position and an orientation of the rotor blade from sensor data provided by a number of sensors of the sensor arrangement.

11. The device according to claim 1, further comprising a number of position adjustment assistance means realized to assist a movement of the device relative to the rotor blade.

12. The device according to claim 11, whereby the position adjustment assistance means comprise at least one of:
- a display for an operator,
- a sound and/or light signal generating unit realized to output sound and/or light signals representing a position of the device relative to the rotor blade,
- an automatic movement mechanism realized to automatically move the blade gripping tools of the device into a predefined gripping position with respect to the rotor blade.

13. The device according to claim 1, comprising
a first frame which is essentially horizontally aligned in a designated operating position and
a second frame which is essentially horizontally aligned in the designated operating position and
the blade gripping assembly,
whereby the first frame and the second frame are connected to each other via a swivel connection, the swivel connection realized to permit a yawing movement of the second frame relative to the first frame.

14. The device according to claim 1, wherein at least one blade gripping tool comprises
a sling and
an automatic sling handover mechanism comprising a sling-conveying element and a sling-receiving element, whereby the sling-conveying element is realized to convey a connection means of the sling along a two-dimensional predefined path of travel around a part of the rotor blade towards the sling-receiving element to connect to a receptor of the sling-receiving element.

15. A method of moving a blade gripping device with at least one frame for gripping a rotor blade of a wind turbine, relative to the rotor blade, whereby the device comprises a blade gripping assembly with a number of blade gripping tools including a seat which has a portion which conforms to a rotor blade, said seat being on one side and a sling on the other side for encircling opposite sides of the rotor blade, and a sensor arrangement and whereby the sensor arrangement senses a specific feature of the rotor blade in order to support a movement of the device, whereby the specific feature is such that it is used to tilt the seat and the sling about a horizontal axis relative to the frame and the rotor blade in a blade gripping manoeuvre.

16. The method of claim 15, further comprising the step of computing a specific position of the rotor blade with a position computation unit.

* * * * *